(12) United States Patent
Beard et al.

(10) Patent No.: US 9,067,099 B2
(45) Date of Patent: Jun. 30, 2015

(54) APPARATUS, SYSTEM, AND METHOD FOR GENERATING POWER FOR EXERCISE EQUIPMENT

(76) Inventors: David Beard, Santa Ana, CA (US);
Si-Hyung Lee, Torrance, CA (US);
Kevin Corbalis, Tustin, CA (US);
Victor Cornejo, Riverside, CA (US);
Deo Magakat, Colton, CA (US);
Shatish Mistry, Irvine, CA (US)

( * ) Notice: Subject to any disclaimer, the term of this patent is extended or adjusted under 35 U.S.C. 154(b) by 419 days.

(21) Appl. No.: 13/418,284

(22) Filed: Mar. 12, 2012

(65) Prior Publication Data
US 2012/0238406 A1 Sep. 20, 2012

Related U.S. Application Data

(63) Continuation-in-part of application No. 13/048,860, filed on Mar. 15, 2011.

(51) Int. Cl.
| | |
|---|---|
| A63B 22/06 | (2006.01) |
| A63B 21/005 | (2006.01) |
| A63B 21/22 | (2006.01) |
| A63B 24/00 | (2006.01) |
| A63B 71/06 | (2006.01) |
| H02K 21/24 | (2006.01) |
| A63B 22/00 | (2006.01) |

(Continued)

(52) U.S. Cl.
CPC ......... *A63B 22/0605* (2013.01); *A63B 21/0053* (2013.01); *A63B 21/0056* (2013.01); *A63B 21/227* (2013.01); *A63B 24/0006* (2013.01); *A63B 24/0062* (2013.01); *A63B 24/0084* (2013.01); *A63B 24/0087* (2013.01); *A63B 71/0619* (2013.01); *A63B 71/0622* (2013.01); *A63B 2071/0644* (2013.01); *A63B 2071/0655* (2013.01); *A63B 2220/30* (2013.01); *A63B 2220/51* (2013.01); *A63B 2220/805* (2013.01); *A63B 2220/833* (2013.01); *A63B 2225/15* (2013.01); *A63B 2225/20* (2013.01); *A63B 2230/045* (2013.01); *A63B 22/0046* (2013.01); *H02K 21/24* (2013.01); *H02K 7/1815* (2013.01); *H02M 7/06* (2013.01)

(58) Field of Classification Search
CPC .. A63B 2021/222; A63B 21/22; A63B 23/14; A63B 2071/0644; A63B 2071/0655; A63B 21/0053; A63B 21/0056
USPC .................................................. 482/1–9, 57
See application file for complete search history.

(56) References Cited

U.S. PATENT DOCUMENTS

| | | | |
|---|---|---|---|
| 7,083,551 B1 * | 8/2006 | Lassanske et al. .............. | 482/61 |
| 7,585,258 B2 * | 9/2009 | Watson et al. .................. | 482/63 |
| 7,608,015 B2 * | 10/2009 | Radow .............................. | 482/4 |

(Continued)

*Primary Examiner* — Stephen Crow
(74) *Attorney, Agent, or Firm* — Brown IP Law, LC; Kerry W. Brown

(57) ABSTRACT

An exercise apparatus with a generator. The exercise apparatus includes a frame, a rotating component, a generator, and a battery. The rotating component is rotatably connected to the frame and the rotating component rotates in response to operation of the exercise apparatus. The generator is connected to the rotating component and the frame. The generator includes a rotor connected to the rotating component and a stator. The rotor rotates in response to rotation of the rotating component. The stator is connected to the frame. The stator interacts with the rotor to produce electric current at an output. In one embodiment, the battery is connected to the output wherein the battery is charged by electric current from the generator.

18 Claims, 29 Drawing Sheets

(51) Int. Cl.
*H02K 7/18* (2006.01)
*H02M 7/06* (2006.01)

(56) References Cited

U.S. PATENT DOCUMENTS

| | | | |
|---|---|---|---|
| 7,727,124 B1* | 6/2010 | Lassanske et al. | 482/61 |
| 7,766,798 B2* | 8/2010 | Hamilton | 482/61 |
| 7,833,135 B2* | 11/2010 | Radow et al. | 482/57 |
| 7,862,476 B2* | 1/2011 | Blau et al. | 482/8 |
| 8,439,808 B2* | 5/2013 | Hamilton | 482/61 |
| 2003/0073546 A1* | 4/2003 | Lassanske et al. | 482/63 |
| 2006/0079382 A1* | 4/2006 | Lassanske et al. | 482/63 |
| 2007/0296313 A1* | 12/2007 | Wang | 310/67 A |
| 2009/0111663 A1* | 4/2009 | Kuo | 482/53 |
| 2013/0079199 A1* | 3/2013 | Hamilton | 482/61 |

* cited by examiner

APPARATUS, SYSTEM, AND METHOD FOR GENERATING POWER FOR EXERCISE EQUIPMENT

CROSS REFERENCE TO RELATED APPLICATIONS

This application is a continuation in part of U.S. patent application Ser. No. 13/048,860, filed on Mar. 15, 2011, titled "APPARATUS, SYSTEM, AND METHOD FOR CYCLE IMPROVEMENTS," which is incorporated herein by reference and made part of this Specification.

BACKGROUND

Many exercise devices require electrical power to operate features of the exercise devices. Some exercise devices receive this power from a power connection to a wall or floor plug wired to an electric utility or generator. Other exercise devices derive their electrical power from batteries. For example, many exercise cycles have a computer that reports information about a workout on a display. These computers are typically powered by a battery. Some exercise devices have other components requiring batteries, such as sending units on speed sensors.

One significant drawback to battery powered exercise devices is that the batteries must be periodically replaced. Battery replacement can be a tedious and annoying exercise for a single exercise device, and it becomes a major irritation for commercial gym operators that must regularly replace batteries in rooms full of exercise devices.

SUMMARY

Embodiments of an apparatus are described. In one embodiment, the apparatus is an exercise apparatus. The exercise apparatus, in one embodiment, includes a frame, a rotating component, a generator, and a battery. The rotating component is rotatably connected to the frame and the rotating component rotates in response to operation of the exercise apparatus. The generator is connected to the rotating component and the frame. The generator includes a rotor connected to the rotating component and a stator. The rotor rotates in response to rotation of the rotating component. The stator is connected to the frame. The stator interacts with the rotor to produce electric current at an output. In one embodiment, the battery is connected to the output wherein the battery is charged by electric current from the generator.

In certain embodiments, the exercise apparatus is a cycle, a stationary cycle, an elliptical machine, a stepper, a rowing machine, or a treadmill. The rotor, in some embodiments, includes either a plurality of permanent magnets or a plurality of induction coils. The stator may include a plurality of permanent magnets or a plurality of induction coils. Rotation of the rotor may cause a plurality of induction coils to pass through magnetic fields generated by a plurality of permanent magnets to induce an electric current in the induction coils.

The rotor, in some embodiments, includes a plurality of permanent magnets and the stator may include a plurality of induction coils. Rotation of the rotor may cause magnetic fields generated by the plurality of permanent magnets to sweep across the plurality of induction coils to induce an electric current in the plurality of induction coils.

In some embodiments, the plurality of induction coils are electrically connected in three groups. The plurality of permanent magnets may be configured such that rotation of the plurality of permanent magnets across the three groups of induction coils generates three-phase power. The groups of induction coils may be electrically connected in a star arrangement or a delta arrangement.

The rotor, in some embodiments, includes sixteen magnets and the stator may include twelve induction coils. Each of the plurality of induction coils may include an induction coil on each of a plurality of stacked printed circuit board layers arranged to place the induction coil on each of the plurality of printed circuit board layers under the simultaneous influence of the same magnetic field. In some embodiments, the rotor includes a plurality of magnets arranged with alternating poles directed toward the stator. The rotor may include a plurality of permanent magnets disposed adjacent to a first side of the stator and a plurality of magnets disposed adjacent to a second side of the stator aligned with and having synchronized poles with the magnets disposed adjacent to the first side of the stator.

Each of the plurality of permanent magnets may be in a rectangular shape in the plane orthogonal to the poles of the permanent magnet. Each of the plurality of permanent magnets may be of a pie shape in the plane orthogonal to the poles of the permanent magnet.

The exercise apparatus, in some embodiments, includes a variable electrical load device that provides a variable electrical load. A braking torque applied by the generator to the rotating component may increase in response to an increase in the variable electrical load.

Embodiments of a system are also described. The system may be an exercise equipment system. The system includes an exercise apparatus, a generator, and a computer. The exercise apparatus may include a frame and a rotating component. The rotating component may be rotatably connected to the frame. The rotating component may rotate in response to operation of the exercise apparatus. The generator may be connected to the exercise apparatus and include a rotor and a stator. The rotor may be connected to the rotating component and rotate in response to rotation of the rotating component. The stator is connected to the frame and interacts with the rotor to produce electric current at an output. The computer, in one embodiment, is in electrical communication with the generator and includes a processor, a memory device, and a display driver. The processor may conduct operations on one or more input signals from the exercise equipment system to determine information relating to operation of the exercise equipment system. The memory device may store digital data for use in the operation of the processor. The display driver may generate a display of information determined by the processor.

The exercise equipment system may also include a voltage regulator to regulate voltage produced by the generator. In some embodiments, the exercise equipment system includes a battery electrically connected to the generator. Power from the generator may charge the battery. In some embodiments, the generator powers the computer. In another embodiment, the generator provides power for a personal electronic device via a charging port connected to the exercise equipment system.

In one embodiment, the generator includes a speed output that provides a waveform generated by the generator. The computer may include a rate meter in electrical communication with the speed output. The rate meter may include computer instructions to direct the processor to determine a rate of operation of the exercise equipment system based on the waveform from the speed output. The computer, in some embodiments, displays the rate of operation of the exercise equipment. Other embodiments of the system are also described.

Embodiments of a method are also described. In one embodiment, the method is a method for generating and using electrical power in an exercise apparatus. Embodiments of the method include generating electrical power at a generator attached to the exercise apparatus. The method may also include converting alternating current from the generator to direct current at a rectifier. In one embodiment, the method includes regulating the electrical power generated by the generator at a voltage regulator, charging a battery with the regulated electrical power, supplying power to a computer attached to the exercise apparatus with power from the battery and computing a rate of operation of the exercise apparatus using a speed output signal generated by the generator.

Other aspects and advantages of embodiments of the present invention will become apparent from the following detailed description, taken in conjunction with the accompanying drawings, illustrated by way of example of the principles of embodiments of the invention.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments provide a generator driven by a user of an exercise device that provides power for the exercise device.

As used herein, the term "lateral" refers to a direction away from a central plane dividing the exercise device into left and right halves. As used herein, the term "medial" refers to a direction toward a central plane dividing the exercise device into left and right halves.

Figure 1A:
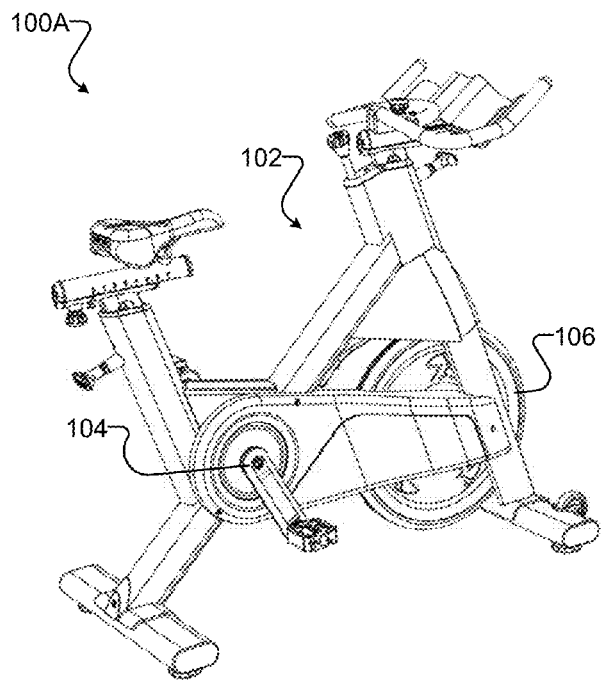
FIG. 1A depicts a perspective view of one embodiment of a cycle.

FIG. 1A depicts a perspective view of one embodiment of a cycle 100A. The cycle 100A includes a frame 102, a crank 104, and a driven wheel 106. In the illustrated embodiment, the cycle 100A is a stationary exercise cycle.

The frame 102, in one embodiment, is a structure to support other components of the cycle 100A. The frame 102 may include connecting structures for the other components, including one or more hangers, droupouts, bores, and slots. In some embodiments, the frame 102 includes one or more tubes. The tubes may be of any cross sectional shape, including, but not limited to, circular, oval, D-shaped, or polygonal. In some embodiments, the frame 102 includes components having irregularly shaped cross sections.

The frame may include any material strong and rigid enough to support the components of the cycle 100A during use. For example, the frame may have materials including, but not limited to, steel, aluminum, titanium, magnesium, or carbon fiber in a polymer matrix. Furthermore, the frame may include any known alloys or combinations of materials.

In one embodiment, the crank 104 is rotatably connected to the frame 102. The crank 104 may be connected to the frame 102 using any bearing or bearings known in the art. The crank 104 is described in greater detail below in relation to FIG. 2.

In certain embodiments, the crank 104 is operatively connected to the driven wheel 106. The crank 104 may be operatively connected to the driven wheel 106 using any operative connection known in the art. For example, the crank 104 may be operatively connected to the driven wheel 106 using a chain, a belt, a cable, a shaft, a gear, or a gear train.

The crank 104, in one embodiment, is operatively connected to the driven wheel 106 to cause the driven wheel 106 to rotate in response to rotation of the crank 104. In some embodiments, the operative connection between the crank 104 and the driven wheel 106 causes the driven wheel 106 to rotate in the same direction as the crank 104. In an alternative embodiment, the operative connection between the crank 104 and the driven wheel 106 causes the driven wheel 106 to rotate in the opposite direction to the crank 104.

The driven wheel 106 may be any type of wheel capable of rotation in response to rotation of the crank 104. For example, the driven wheel 106 may be a flywheel. The flywheel may be a metal wheel suspended by the frame 102.

Figure 1B:
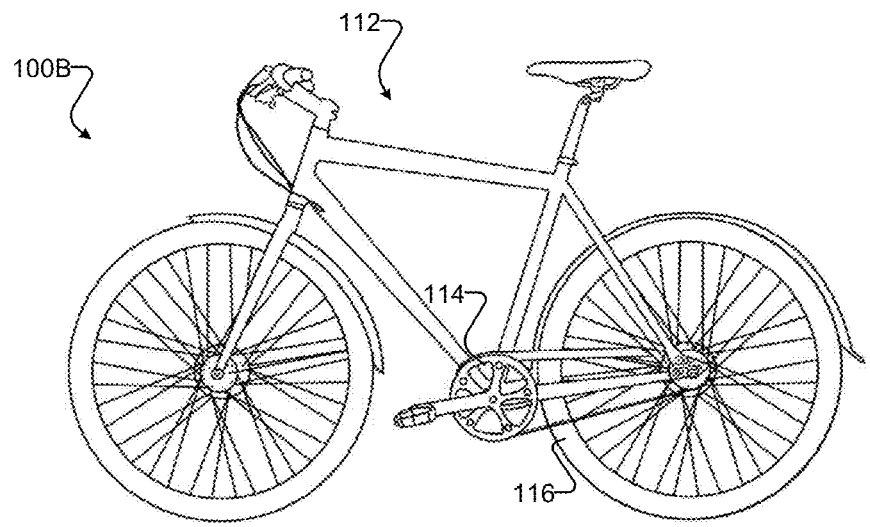
FIG. 1B depicts a perspective view of another embodiment of a cycle

FIG. 1B depicts a perspective view of another embodiment of a cycle 100B. The cycle 100B includes a frame 112, a crank 114, and a driven wheel 116. In the illustrated embodiment, the cycle 100B is a mountain bicycle. In an alternative embodiment, the cycle 100B may be any type of cycle, including, but not limited to, a road bicycle, a hybrid bicycle, or a BMX bicycle.

The frame 112, in one embodiment, is a structure to support other components of the cycle 100B. The frame 112 may include connecting structures for the other components, including one or more hangers, droupouts, bores, and slots. In some embodiments, the frame 112 includes one or more tubes. The tubes may be of any cross sectional shape, including, but not limited to, circular, oval, D-shaped, or polygonal. In some embodiments, the frame 112 includes components having irregularly shaped cross sections.

The frame may include any material strong and rigid enough to support the components of the cycle 100B during use. For example, the frame 112 may have materials including, but not limited to, steel, aluminum, titanium, magnesium, or carbon fiber in a polymer matrix. Furthermore, the frame 112 may include any known alloys or combinations of materials.

In one embodiment, the crank 114 is rotatably connected to the frame 112. The crank 114 may be connected to the frame 112 using any bearing or bearings known in the art. In certain embodiments, the crank 114 is operatively connected to the driven wheel 116. The crank 114 may be operatively connected to the driven wheel 116 using any operative connection known in the art. For example, the crank 114 may be operatively connected to the driven wheel 116 using a chain, a belt, a cable, a shaft, a gear, or a gear train.

The crank 114, in one embodiment, is operatively connected to the driven wheel 116 to cause the driven wheel 106 to rotate in response to rotation of the crank 114. In some embodiments, the operative connection between the crank 114 and the driven wheel 116 causes the driven wheel 116 to rotate in the same direction as the crank 114.

The driven wheel 116 may be any type of wheel capable of rotation in response to rotation of the crank 114. For example, the driven wheel 116 may include a hub, one or more spokes, a rim, and a tire. The driven wheel 116 may be fixed at the hub to the frame 112.

Figure 2:
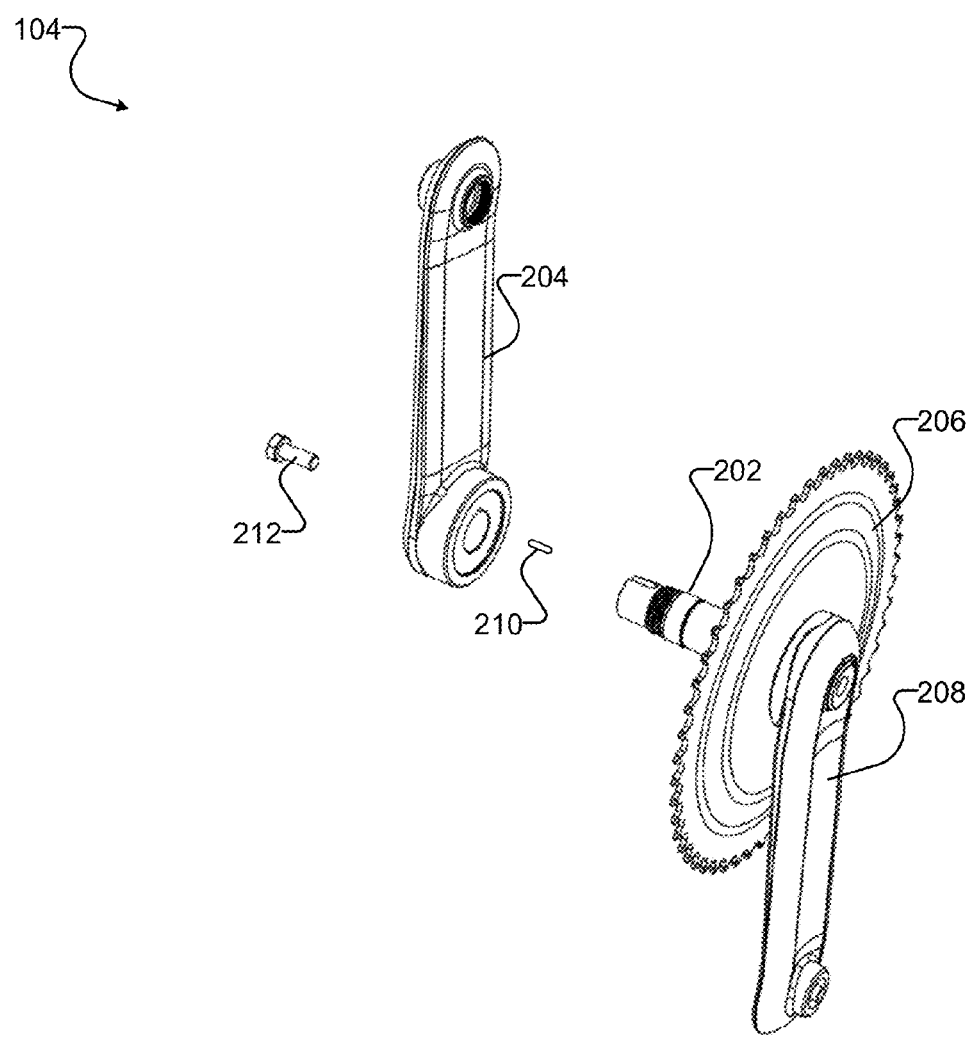
FIG. 2 depicts a perspective view of one embodiment of the crank of FIG. 1A.

FIG. 2 depicts a perspective view of one embodiment of the crank 104 of FIG. 1A. The crank 104 includes a crank spindle 202 and a crank arm 204. The crank 104 receives a force input from a user, translates the force input into rotation, and transmits the force to other components of the cycle 100A.

The crank spindle 202, in one embodiment, is rotatable relative to the frame 102. The crank spindle 202 may be supported by one or more bearings (not shown) and interface with the crank arm 204. The crank spindle 204, in one embodiment, positions the crank arm 204 relative to the frame 102 and an opposing crank arm. The crank spindle 202 may transmit rotation to a chain ring 206.

The crank spindle 202 may include any material capable of withstanding the forces transmitted by the crank spindle 202. For example, the crank spindle 202 may include materials including, but not limited to, steel, aluminum, titanium, magnesium, and alloys or other compositions. In one embodiment, the crank spindle 202 is forged JIS G4051 S15C carbon steel.

In one embodiment, the crank arm 204 is connectable to the crank spindle 202. The crank arm 204 may be non-rotatably connected to the crank spindle 202 such that rotation of the crank arm 204 causes rotation of the crank spindle 202. The crank arm 204 transmits force applied to the crank arm 204 to the spindle 202 and/or the chain ring 206.

The crank arm 204 may include any material capable of withstanding the forces transmitted by the crank arm 204. For example, the crank arm 204 may include materials including, but not limited to, steel, aluminum, titanium, magnesium, and alloys or other compositions. In one embodiment, the crank arm 204 is forged JIS G4051 S15C carbon steel.

In some embodiments, the crank 104 includes a second crank arm 208. The second crank arm 208 may be similar to the crank arm 204. In some embodiments, the second crank arm 208 is removeably connectable to the crank spindle 202. The second crank arm 208 may include similar structures to those described for the crank arm 204 and be connectable to the crank spindle 202 in a manner similar to the manner described herein for the crank arm 204. In an alternative embodiment, the second crank arm 208 is permanently affixed to or formed integrally with the crank spindle 202.

The crank 104, in some embodiments, includes a dowel pin 210 to aid alignment of the crank arm 204 relative to the crank spindle 202. The dowel pin 210 may align one or more keyways (described below in relation to FIGS. 3A and 4B) to align the crank arm 204 during installation or attachment of the crank arm 204 to the crank spindle 202.

In one embodiment, the crank arm 204 is retained on the crank spindle 202 by a fastener 212. The fastener 212 may be any type of fastener capable of maintaining the crank arm 204 in position relative to the crank spindle 202. For example, the fastener 212 may be a bolt that threads into a threaded bore (described below in relation to FIG. 3A) in the crank spindle 202. In this example the head of the bolt engages a surface on the crank arm 204. In another example, the fastener 212 may be a snap ring.

Figure 3A:
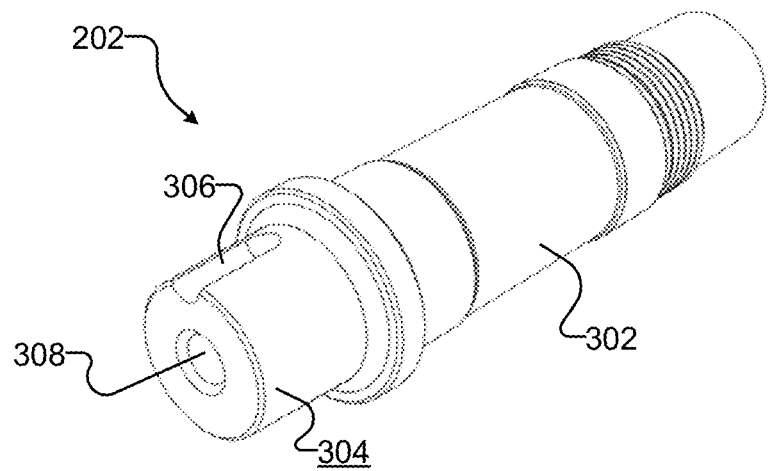
FIG. 3A depicts a perspective view of one embodiment of the crank spindle of FIG. 2.

FIG. 3A depicts a perspective view of one embodiment of the crank spindle 202 of FIG. 2. The crank spindle 202 includes a crank spindle body 302 and a crank mating surface 304. The spindle 202 aligns the crank arm 204 and the second crank arm 208 relative to the frame 102 and each other, and transmits rotation from the crank arm 204 to the chain ring 206.

The crank spindle body 302 includes one or more bearing surfaces that contact bearings. The crank spindle body 302 extends laterally to one or more crank mating surfaces 304. In one embodiment, the crank spindle body 302 and the one or more crank mating surfaces 304 are part of a unitary crank spindle 202.

The crank mating surface 304, in one embodiment, is a surface that mates with a corresponding surface on the crank arm 204. The portion of the crank spindle 202 along which the crank mating surface 304 runs has a substantially round cross section along at least a portion of the lateral length of the crank mating surface 304. In one embodiment, the spindle 202 has a substantially circular cross section along the entire lateral length of the crank mating surface 304. In certain embodiments, the crank mating surface 304 includes a taper such that the diameter of the crank spindle 202 decreases in a lateral direction along at least a portion of the crank mating surface 304. In one embodiment, the diameter of the crank spindle 202 decreases in a lateral direction along the entire lateral length of the crank mating surface 304.

In some embodiments, the crank mating surface 304 is free from splines and is entirely non-planar. In one embodiment, the crank mating surface 304 is essentially smooth. The crank mating surface 304 may include a crank spindle keyway 306 to aid in alignment of the crank arm 204 relative to the crank spindle 202. In some embodiments, the crank spindle keyway 306 is configured to receive a dowel pin 210.

The crank spindle 202, in some embodiments, includes a threaded crank spindle bore 308 at a lateral end of the crank spindle 202. The crank spindle bore 308 may share a common axis with the crank spindle 202. The crank spindle bore 308 receives a fastener 212 for retaining the crank arm 204 on the crank spindle 202.

Figure 3B:
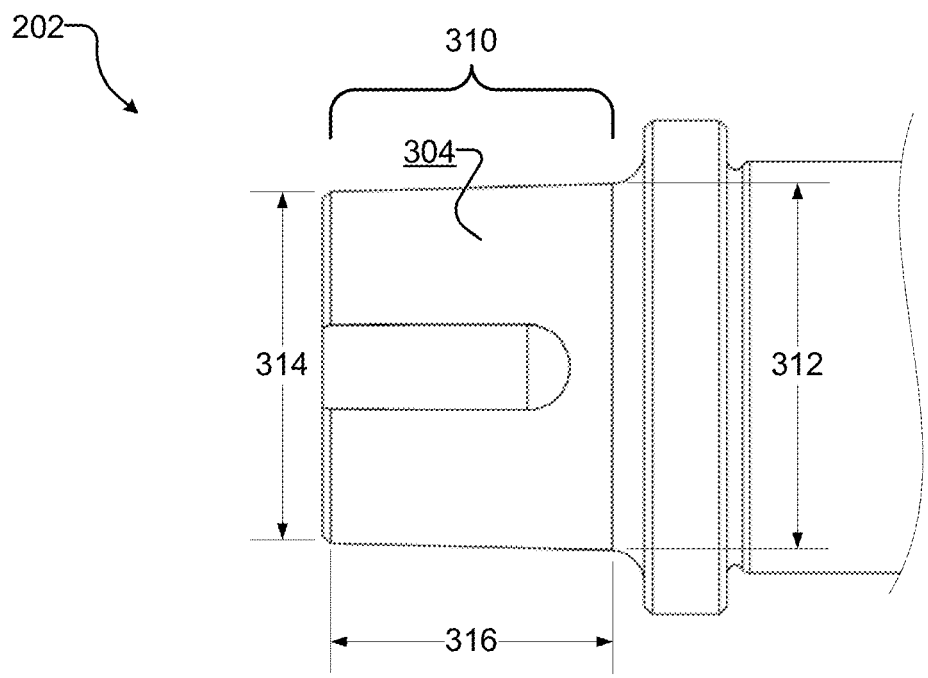
FIG. 3B depicts a cut-away front view of one embodiment of the crank spindle of FIG. 2

FIG. 3B depicts a cut-away front view of one embodiment of the crank spindle 202 of FIG. 2. The crank spindle 202 includes a crank mating surface 304. The crank mating surface 304, in one embodiment, includes a crank spindle taper 310.

In some embodiments, the crank spindle taper 310 includes a major diameter 312, a minor diameter 314, and a taper length 316. The major diameter 312 is the diameter of the crank spindle 202 at the medial border of the crank spindle taper 310. The minor diameter 312 is the diameter of the crank spindle 202 at the lateral end of the crank spindle taper 310. The taper length 316 is the lateral length of the crank spindle taper 310. In one embodiment, the major diameter is approximately 22.0 mm. In some embodiments, the major diameter is at least 22.0 mm.

In some embodiments, the crank spindle taper 310 includes a continuous decrease of the diameter of the crank spindle 202 between the major diameter 312 and the minor diameter 314. The rate of decrease, or "taper rate" of the crank spindle 202 diameter between the major diameter 312 and the minor diameter 314 may be constant.

The taper rate along the crank spindle taper 310 may be measured as units of diameter decrease per unit of taper length. In the case where the taper rate is constant, the taper rate may be expressed as the major diameter 312 minus the minor diameter 314 divided by the taper length 316. Taper rate may also be expressed by "taper," which is a normalized ratio of units of taper length per unit of diameter change.

The taper rate may conform to one or more standards for machine tapers. Machine taper standards define shapes of tapered surface that have been found to provide torque transfer between a tapered shank and a collet having a matching taper. Machine tapers provide torque transfer via friction across the mating surface between the tapered shank and the correspondingly tapered collet. This type of torque transfer does not suffer from the line loads and force concentrations associated with traditional square taper and splined crank connections. Machine tapers have traditionally been used to secure bits in machine tools.

Examples of machine taper standards include, but are not limited to, Morse tapers, Brown & Sharpe tapers, Jacobs tapers, Jarno tapers, R8 Tapers, and NMTB tapers. Tables 1-5 below illustrate several standard machine tapers with corresponding taper rates. In embodiments of the crank spindle 202, the crank spindle taper 310 may be any of the standard machine taper rates described below, or be within a range defined by the machine taper rates below. Table 1 describes standard Morse taper rates, Table 2 describes Brown & Sharpe taper rates, and Table 3 describes Jacobs taper rates.

TABLE 1

| Morse Taper number | Taper | Major Diameter (mm) | Taper Angle | Taper Length (mm) | Taper Rate |
|---|---|---|---|---|---|
| 0 | 19.212:1 | 9.045 | 1- 29' 27" | 46 | 0.052051 |
| 1 | 20.047:1 | 12.065 | 1- 25' 43" | 48.5 | 0.049883 |
| 2 | 20.020:1 | 17.78 | 1- 25' 50" | 59 | 0.04995 |
| 3 | 19.922:1 | 23.825 | 1- 26' 16" | 74 | 0.050196 |
| 4 | 19.254:1 | 31.267 | 1- 29' 15" | 93.5 | 0.051937 |
| 5 | 19.002:1 | 44.399 | 1- 30' 26" | 120.5 | 0.052626 |
| 6 | 19.180:1 | 63.348 | 1- 29' 36" | 170 | 0.052138 |
| 7 | 19.231:1 | 83.058 | 1- 29' 22" | 250.85 | 0.051999 |

As shown in Table 1, Morse taper rates range from 0.049883 to 0.052626. In some embodiments, the taper rate of the crank spindle taper 310 may be any of the listed Morse taper rates, or any taper rate between 0.0490 and 0.0530. The major diameter 312 of the crank spindle taper 310, in some embodiments, may be any of the listed Morse taper major diameters, or any length between 9 mm and 84 mm. The taper length 316 of the crank spindle taper 310, in certain embodiments, may be any of the listed Morse taper lengths, or any length between 45 mm and 255 mm.

TABLE 2

| Brown & Sharpe Size | Major Diameter (in) | Minor Diameter (in) | Taper Length (in) | Taper Rate |
|---|---|---|---|---|
| 1 | 0.2392 | 0.2 | 0.94 | 0.041833 |
| 2 | 0.2997 | 0.25 | 1.19 | 0.041833 |
| 3 | 0.3753 | 0.3125 | 1.5 | 0.041833 |
| 4 | 0.4207 | 0.35 | 1.69 | 0.041867 |
| 5 | 0.5388 | 0.45 | 2.13 | 0.0418 |
| 6 | 0.5996 | 0.5 | 2.38 | 0.041942 |
| 7 | 0.7201 | 0.6 | 2.88 | 0.04175 |
| 8 | 0.8987 | 0.75 | 3.56 | 0.04175 |
| 9 | 1.0775 | 0.9001 | 4.25 | 0.041742 |
| 10 | 1.2597 | 1.0447 | 5 | 0.043008 |
| 11 | 1.4978 | 1.25 | 5.94 | 0.04175 |
| 12 | 1.7968 | 1.5001 | 7.13 | 0.041642 |
| 13 | 2.0731 | 1.7501 | 7.75 | 0.041683 |
| 14 | 2.3438 | 2 | 8.25 | 0.041667 |
| 15 | 2.6146 | 2.25 | 8.75 | 0.041667 |
| 16 | 2.8854 | 2.5 | 9.25 | 0.041667 |
| 17 | 3.1563 | 2.75 | 9.75 | 0.041667 |
| 18 | 3.4271 | 3 | 10.25 | 0.041667 |

As shown in Table 2, Brown & Sharpe taper rates range from 0.041642 to 0.043008. In some embodiments, the taper rate of the crank spindle taper 310 may be any of the listed Brown & Sharpe taper rates, or any taper rate between 0.0410 and 0.0435. The major diameter 312 of the crank spindle taper 310, in some embodiments, may be any of the listed Brown &

Sharpe taper major diameters, or any diameter between 0.23 inches and 3.5 inches. The taper length 316 of the crank spindle taper 310, in certain embodiments, may be any of the listed Brown & Sharpe taper lengths, or any length between 0.94 inches and 10.25 inches.

TABLE 3

| Jacobs Taper number | Minor Diameter (mm) | Major Diameter (mm) | Taper Length (mm) | Taper Rate |
|---|---|---|---|---|
| 0 | 5.8 | 6.35 | 11.11 | 0.049505 |
| 1 | 8.47 | 9.75 | 16.67 | 0.076785 |
| 2 | 12.39 | 14.2 | 22.23 | 0.081422 |
| 2 Short | 12.39 | 13.94 | 19.05 | 0.081365 |
| 2½ | 15.88 | 17.2 | 26.8 | 0.049254 |
| 3 | 18.95 | 20.6 | 30.96 | 0.053295 |
| 4 | 26.34 | 28.55 | 42.07 | 0.052531 |
| 5 | 33.43 | 35.89 | 47.63 | 0.051648 |
| 6 | 15.85 | 17.17 | 25.4 | 0.051969 |
| 33 | 14.23 | 15.85 | 25.4 | 0.06378 |

As shown in Table 3, Jacobs taper rates range from 0.049254 to 0.081422. In some embodiments, the taper rate of the crank spindle taper 310 may be any of the listed Jacobs taper rates, or any taper rate between 0.0490 and 0.0820. The major diameter 312 of the crank spindle taper 310, in some embodiments, may be any of the listed Jacobs taper major diameters, or any diameter between 6.3 mm and 36 mm. The taper length 316 of the crank spindle taper 310, in certain embodiments, may be any of the listed Jacobs taper lengths, or any length between 11 mm and 50 mm.

Several other standard machine tapers are defined, and the crank spindle taper 310 may have a taper rate that corresponds to any of the standard machine tapers in some embodiments. For example, the crank spindle taper may have a taper rate that corresponds to a Jarno taper, which all have a taper rate of approximately 0.05 units of diameter decrease per lateral unit of length.

Figure 4A:
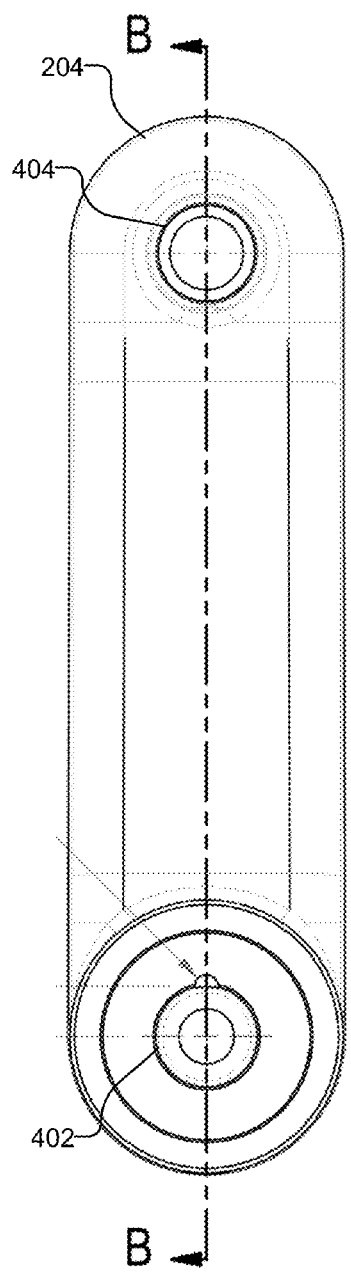
FIG. 4A depicts a side view of one embodiment of the crank arm of FIG. 2.
Figure 4B:
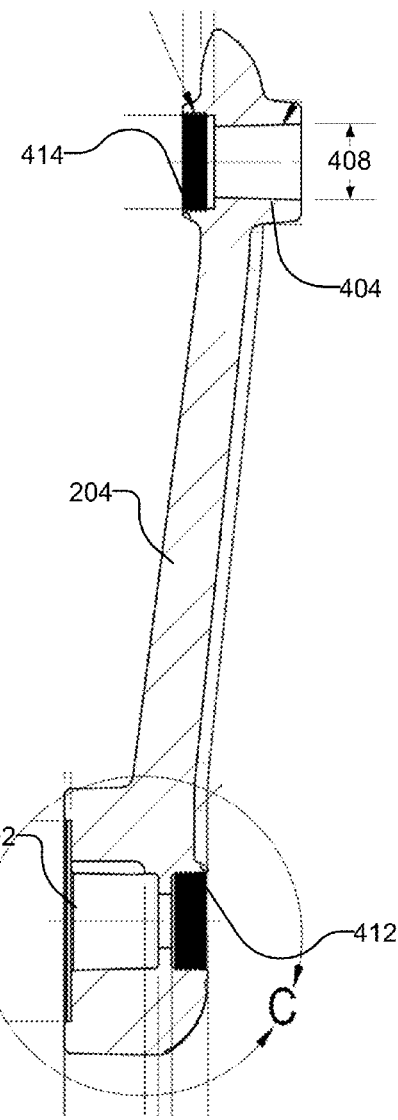
FIG. 4B depicts a front cross-sectional view of one embodiment of the crank arm of FIG. 2.
Figure 4C:
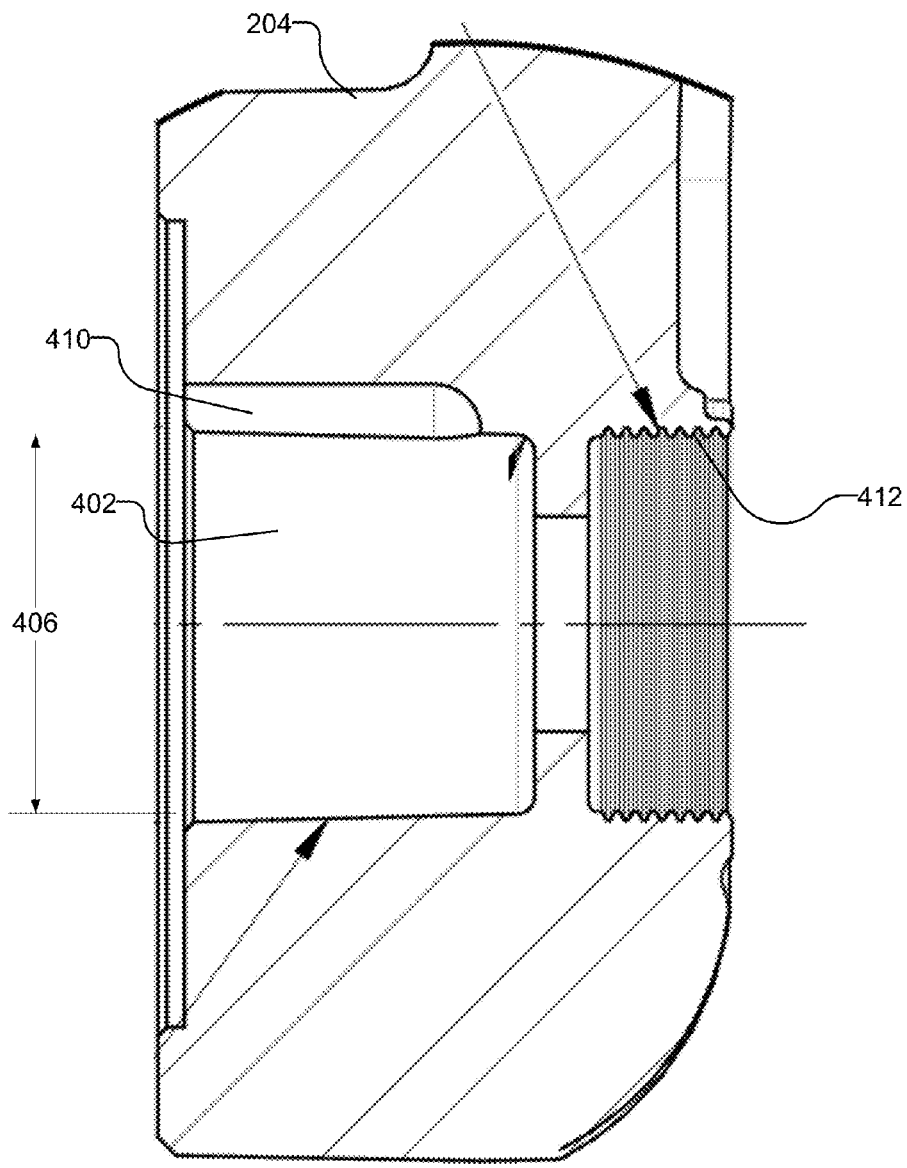
FIG. 4C depicts a portion of a front cross-sectional view of one embodiment of the crank arm of FIG. 2.

FIGS. 4A-4C depict a side view of one embodiment of the crank arm 204 of FIG. 2, a front cross-sectional view of one embodiment of the crank arm 204 of FIG. 2, and a portion of a front cross-sectional view of one embodiment of the crank arm of FIG. 2, respectively. The crank arm 204 includes a crank bore 402 and a pedal bore 404. The crank bore 402 is sized and tapered to correspond to the crank spindle taper 310. In one embodiment, the crank bore 402 has a major diameter 406 of approximately 22.0 mm. In certain embodiments, the taper of the crank bore 402 corresponds to a standard machine taper as described above.

The pedal bore 404 is sized and tapered to correspond to a pedal spindle taper, described below in relation to FIG. 7A. In one embodiment, the pedal bore 404 has a major diameter 408 of approximately 16.8 mm. In certain embodiments, the taper of the pedal bore 404 corresponds to a standard machine taper as described above.

In some embodiments, the crank bore 402 includes a crank bore keyway 410. The crank bore keyway 410 may be sized to receive a dowel pin in conjunction with a corresponding crank spindle keyway 306. The crank bore keyway 410 may be aligned with the crank spindle keyway 306 to align the crank arm 204 relative to the crank spindle 202.

The crank arm 204, in one embodiment, includes an internal thread 412. The internal thread 412 may be disposed along a common axis with the crank bore 402. In some embodiments, the crank arm includes an internal thread 414 disposed along a common axis with the pedal bore 404. The internal threads 412, 414 are engageable by a crank puller to aid in removal of the crank arm 204 from the crank spindle 202 or a pedal. In one embodiment, the internal thread 412, 414 is an M22 internal thread.

Figure 5:
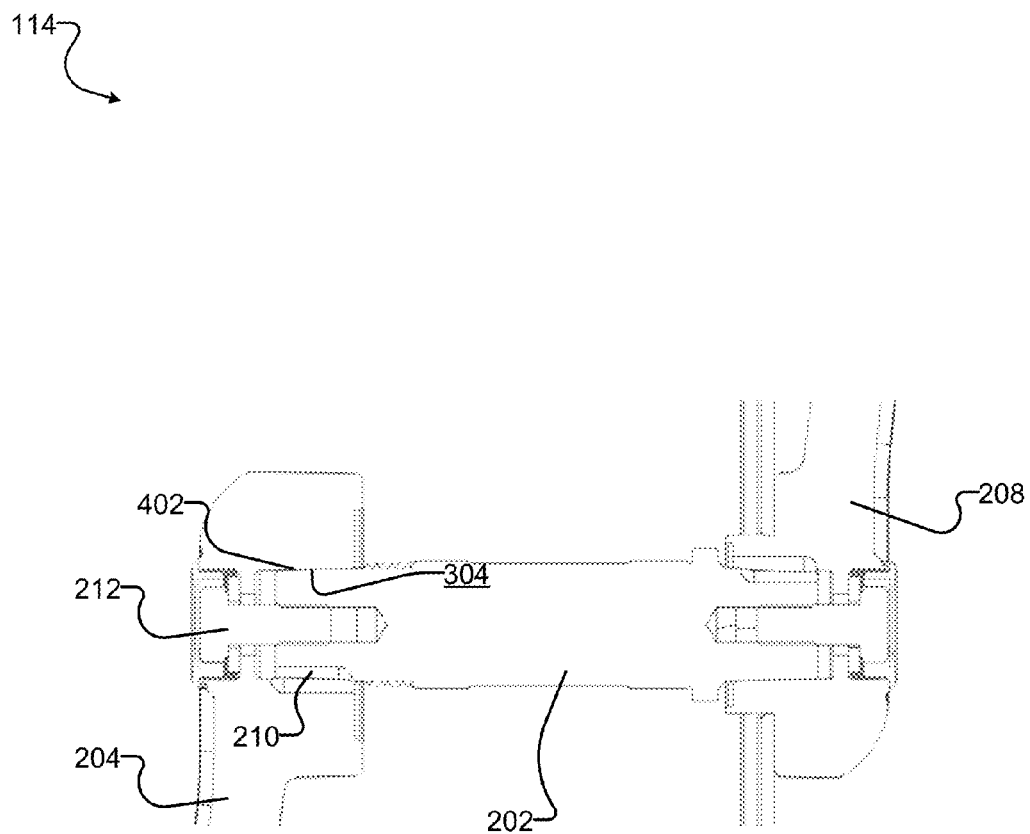
FIG. 5 depicts a rear cross-sectional view of one embodiment of the crank of FIG. 2.

FIG. 5 depicts a rear cross-sectional view of one embodiment of the crank 114 of FIG. 2. The crank 114 includes a crank spindle 202, a crank arm 204, and a second crank arm 208. The crank arm 204 is assembled to the crank spindle 202 such that the tapered crank mating surface 304 of the crank spindle 202 is in interference with the tapered crank bore 402. The tapered connection between the crank spindle 202 and the crank arm 204 transmits torque from the crank arm 204 to the crank spindle 202. This transmission of torque is accomplished with much lower line loads or force concentrations in the crank bore 402 or the spindle 202 than in traditional crank arm/spindle connections.

In some embodiments, the crank arm 204 is aligned relative to the spindle 202 by a dowel pin 210 in keyways 306, 410. The dowel pin 210 primarily aligns the crank arm 204 during assembly to the spindle 202, and does not significantly contribute to torque transmission. The closely machined matching taper between the crank mating surface 304 and the crank bore 402 provides the majority of the torque transmission.

The crank arm 204, in some embodiments, is retained in position relative to the crank spindle 202 by a fastener 212. In the illustrated embodiment, the fastener 212 is a bolt that threads into the crank spindle 202, while the head of the bolt engages the crank arm 204. The fastener 212 maintains an interference fit between the tapered crank mating surface 304 and the crank bore 402 to ensure efficient torque transmission.

Figure 6:
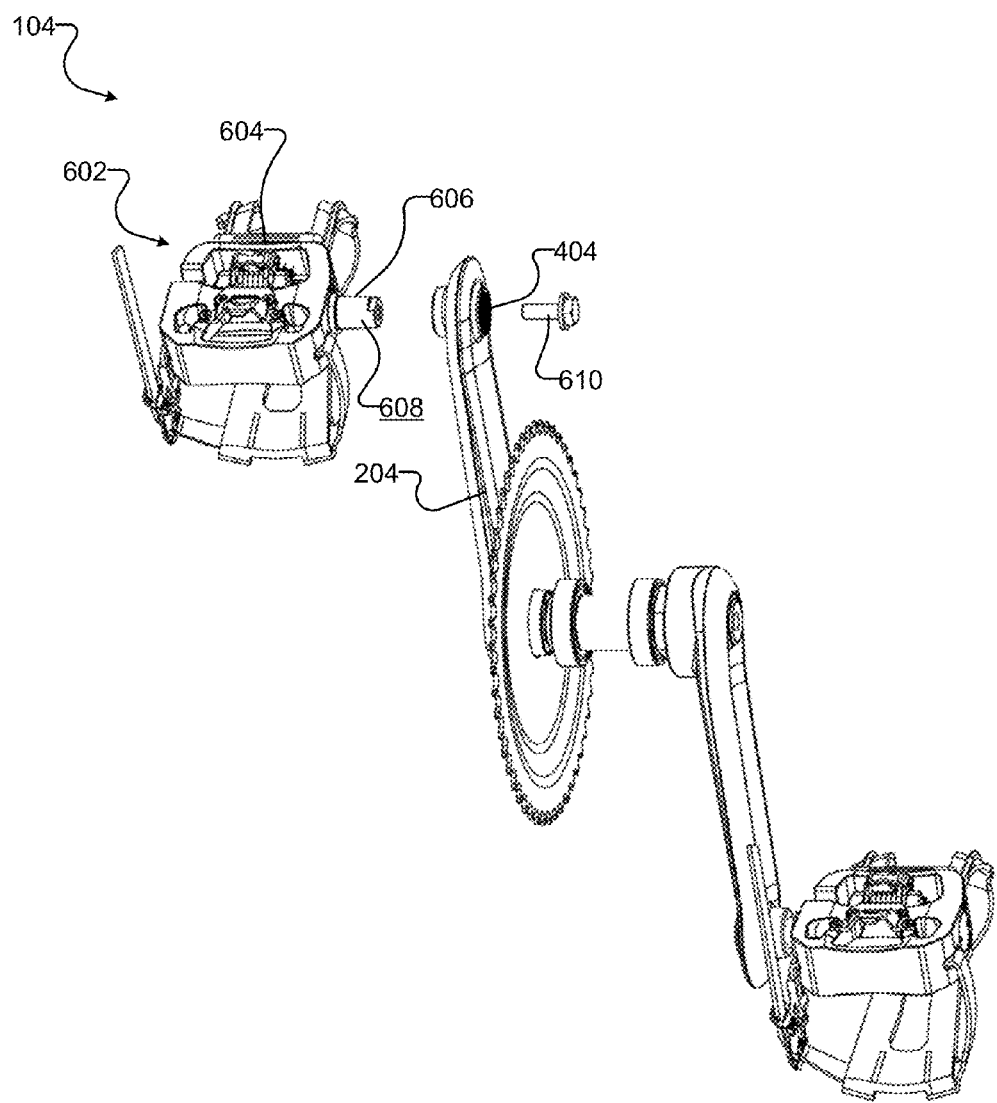
FIG. 6 depicts a perspective view of another embodiment of the crank of FIG. 1A.

FIG. 6 depicts a perspective view of another embodiment of the crank 104 of FIG. 1A. The crank 104 includes a crank arm 204 and a pedal 602. The crank 104 receives a force input from a user at the pedal 602, translates the force input into rotation, and transmits the force to other components of the cycle 100A.

The pedal 602, in one embodiment, includes a pedal body 604 and a pedal spindle 606. The pedal body 604, in one embodiment, includes one or more platforms for engagement by a foot of a user. The pedal body 604 is rotatably connected to the pedal spindle 606 such that the pedal body 604 is rotatable around the pedal spindle 606.

In some embodiments, the pedal spindle 606 includes a pedal mating surface 608 at or near a medial end of the pedal spindle 606. The pedal mating surface 608 is non-rotatably connectable to the crank arm 204 at the pedal bore 404.

In certain embodiments, the pedal mating surface 608 is retained in position relative to the pedal bore 404 by a fastener 610. The fastener 610 may be any type of fastener capable of retaining the pedal 602 to resist lateral movement of the pedal 602. For example, the fastener 610 may be a bolt that engages a threaded bore in the medial end of the pedal spindle 606. In another example, the fastener 610 may be a snap ring that engages the medial end of the pedal spindle 606.

Figure 7A:
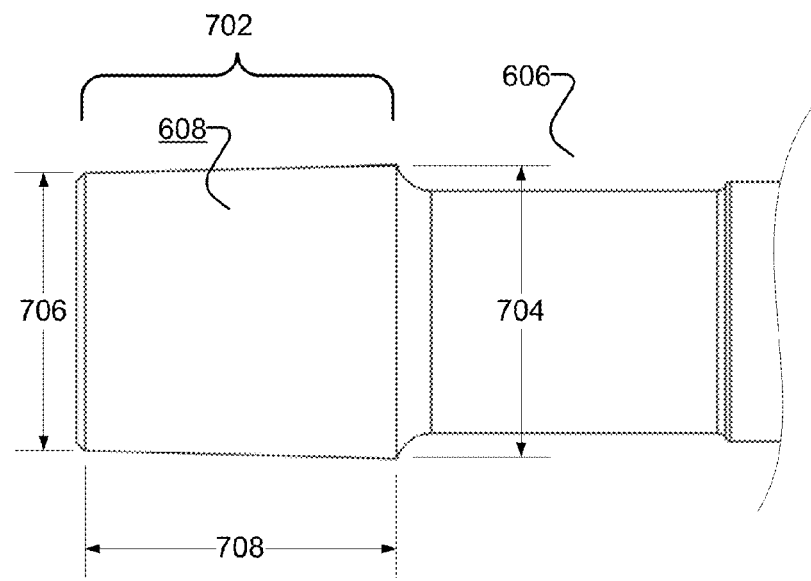
FIG. 7A depicts a cut-away rear view of one embodiment of the pedal spindle of FIG. 6.

FIG. 7A depicts a cut-away rear view of one embodiment of the pedal spindle 606 of FIG. 6. The pedal spindle 606 includes a pedal mating surface 608. The pedal mating surface 608, in one embodiment, includes a pedal spindle taper 702.

In some embodiments, the pedal spindle taper 702 includes a major diameter 704, a minor diameter 706, and a taper length 708. The major diameter 704 is the diameter of the pedal spindle 606 at the lateral border of the pedal spindle taper 702. The minor diameter 706 is the diameter of the pedal spindle 606 at the medial end of the pedal spindle taper 702. The taper length 708 is the medial length of the pedal spindle taper 702. In one embodiment, the major diameter 704 of the pedal spindle taper 702 is approximately 16.8 mm. In some embodiments, the major diameter 704 of the pedal spindle taper 702 is at least 16.8 mm.

In some embodiments, the pedal spindle taper 702 includes a continuous decrease of the diameter of the pedal spindle 606 between the major diameter 704 and the minor diameter 706. The rate of decrease, or "taper rate," of the pedal spindle 606 diameter between the major diameter 704 and the minor diameter 706 may be constant.

The taper rate along the pedal spindle taper 702 may be measured as units of diameter decrease per unit of taper length. In the case where the taper rate is constant, the taper rate may be expressed as the major diameter 704 minus the minor diameter 706 divided by the taper length 708. Taper rate may also be expressed by "taper," which is a normalized ratio of units of taper length per unit of diameter change.

The parameters of the pedal spindle taper 702 may be defined by one or more machine taper standards, as described above, including, but not limited to, a Morse taper, a Brown & Sharpe taper, a Jacobs taper, a Jarno taper, or an NMTB taper. In certain embodiments, the taper rate of the pedal spindle taper 702 may fall within any of the ranges described above in relation to the crank spindle taper 310.

Similar to the crank spindle taper 310, described above, the pedal spindle taper 702 may have an essentially round cross section viewed from the medial side and may have a constant taper rate. The pedal spindle taper 702 may cover a portion of the pedal mating surface 608, all of the pedal mating surface 608, or more than the entire pedal mating surface 608. The pedal mating surface 608, in one embodiment, is essentially smooth. In one embodiment, the pedal mating surface 608 is threadless.

Figure 7B:
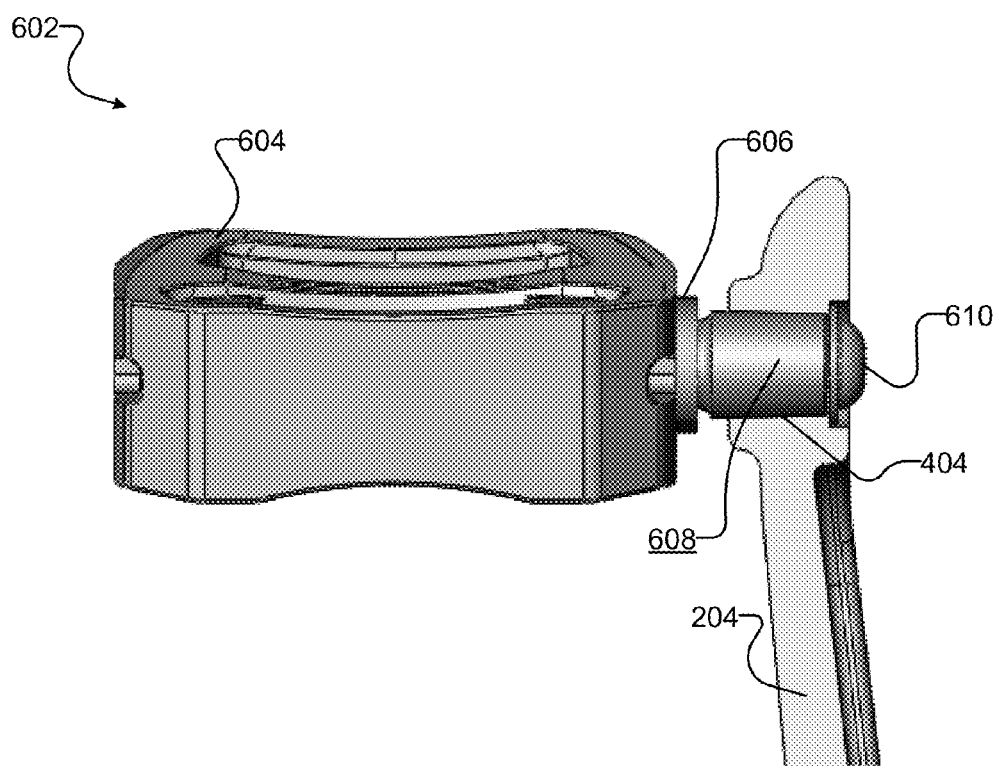
FIG. 7B depicts a cut-away rear view of an assembled pedal/crank arm connection.

FIG. 7B depicts a cut away rear view of an assembled pedal 602 to crank arm 204 connection. The pedal mating surface 608 is placed in an interference relationship with the pedal bore 404. The pedal bore 404 has a taper rate, a major diameter 408 and a length that corresponds to a taper rate, a diameter, and a length of the pedal mating surface 608.

The pedal spindle 606 may be pressed into the pedal bore 404. The interaction between the pedal mating surface 608 and the pedal bore 404 may be such that friction prevents rotation of the pedal mating surface 608 relative to the pedal bore 404 during use. In some embodiments, the pedal mating surface 608 is held in place by a fastener 610. The fastener 610 may be a bolt threaded into a bore in the medial end of the pedal spindle 606. In another embodiment, the fastener 610 may be a snap ring that engages the medial end of the pedal spindle 606.

The pedal 602, in some embodiments, includes a pedal body 604 rotatably connected to the pedal spindle 606. In some embodiments, the pedal body 604 and the pedal spindle 606 are not side specific, meaning that the pedal 602 may be used on either side of the cycle 100A. In other words, in some embodiments, a single pedal 602 design is usable without modification on the left side of the cycle 100A or the right side of the cycle 100A.

In some embodiments, the pedal spindle 606 may be selectively assembled with the pedal body 604 to select a left pedal assembly or a right pedal assembly. A left pedal assembly is installable on the left side of the crank 106, and a right pedal assembly is installable on the right side of the crank. The pedal spindle 606 inserted into the pedal body 604 in a first orientation to form a left pedal assembly, and may be inserted into the pedal body 604 in a second orientation to for a right pedal assembly. In other words, a pedal body 604 and a pedal spindle 606 may be assembled to form a left pedal assembly or a right pedal assembly using the same parts assembled in different positions and/or orientations.

The pedal 602 may also include one or more other components that may be selectably assembled to the pedal body 604 to selectively form a left pedal assembly or a right pedal assembly. For example, the pedal 602 may include a threaded dust cap (not shown) for assembly at a lateral side of the pedal 602 and a threaded grease seal (not shown) for assembly at a medial side of the pedal 602. In this case, the medial and lateral sides of the pedal 602 differ only in whether the pedal 602 is assembled to be a right pedal assembly or a left pedal assembly.

Figure 8:
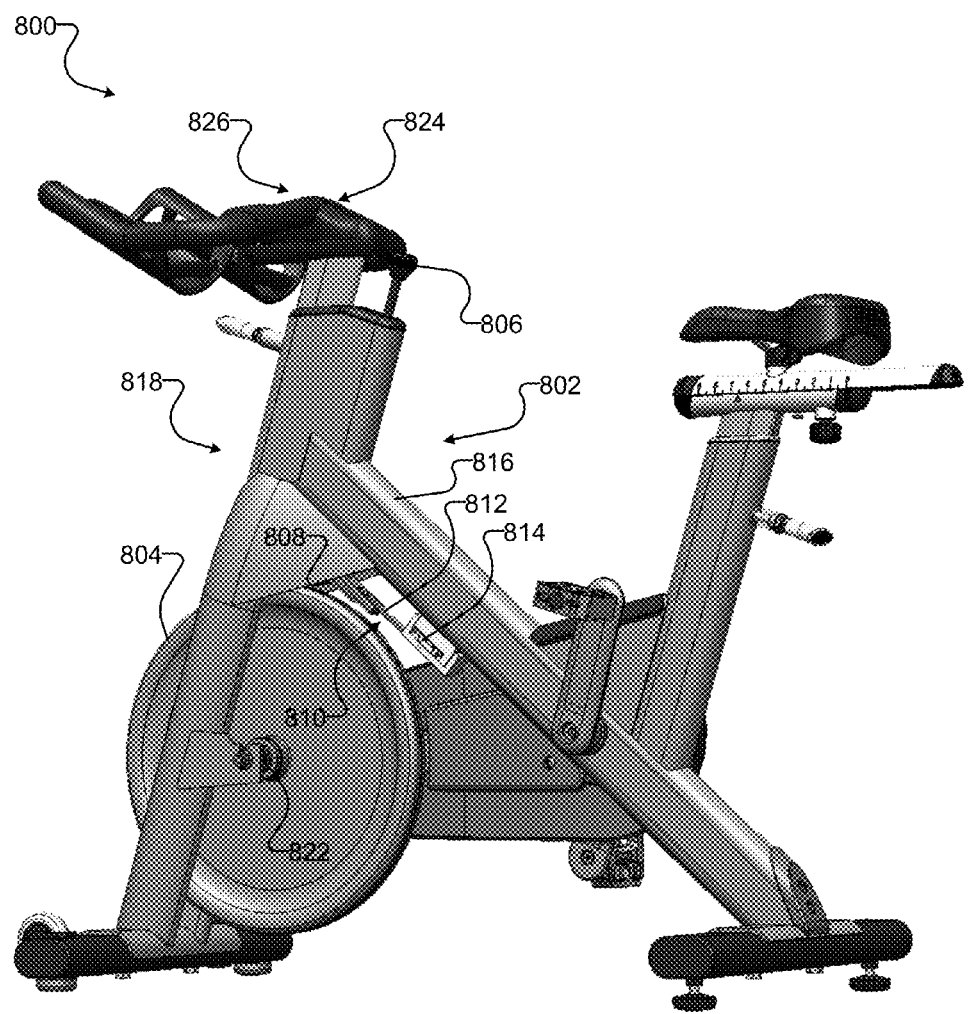
FIG. 8 depicts a perspective view of one embodiment of a cycle having a force measurement system.

FIG. 8 depicts a perspective view of one embodiment of a cycle 800 having a force measurement system 810. The cycle includes a frame 802, a driven wheel 804, an adjustable brake actuator 806, a brake pad 808, and a force measurement system 810.

The frame 802, in one embodiment, supports other components of the cycle 800 and is similar to other frames (102, 112) described above. The driven wheel 804 is suspended by the frame 802 via a rotatable connection with the frame 802. The adjustable brake actuator 806 is connected to the frame 802 and acts on the brake pad 808. The brake pad 808 is positioned tangentially to the driven wheel 804.

The adjustable brake actuator 806 acts on the brake pad 808 by translating the brake pad 808 to the tangential surface of the driven wheel 804. The adjustable brake actuator 806 may apply a force to the brake pad 808 that creates a normal force between the brake pad 808 and the driven wheel 804.

The force measurement system 810, in one embodiment, includes the brake pad 808, a linkage 812, and a force sensor 814. The force measurement system 810 reacts to a tangential force applied to the brake pad 808 by the driven wheel 804. The linkage 812 is connected to the brake pad 808 at a first end of the linkage 812. The linkage 812 is connected to the force sensor 814 at a second end of the linkage 812. The linkage 812 transmits at least some of the tangential force applied to the brake pad 808 to the force sensor 814.

In some embodiments, the linkage 812 positions the brake pad 808 relative to the driven wheel 804. In one embodiment, the linkage 812 is the sole connection of the brake pad 808 to the other components of the cycle 800 when the adjustable brake actuator 806 is fully released. The linkage 812 may include any material capable of transmitting tangential force and supporting the brake pad 808. For example, the linkage 812 may include steel, aluminum, titanium, carbon fiber in a polymer matrix, an alloy, or a composite material.

The force sensor 814, in some embodiments, is connected to the linkage 812 and to the frame 802. In one embodiment, the force sensor 814 is connected to a down tube 816 of the frame 802.

The force sensor 814 receives the force transmitted by the linkage 812 and converts the force to an electrical signal proportional to the force. The force sensor 814 is described in greater detail below in relation to FIG. 10.

In some embodiments, the cycle 800 includes a power measurement system 818. The power measurement system 818 includes the force measurement system 810, an RPM sensor 822, and a computer 824. The power measurement system 818 computes the power being generated by a user based on the force detected by the force measurement system 810 and the rotation rate of the driven wheel 804 detected by the RPM sensor 822.

In one embodiment, the cycle 800 includes a display 826 to display the force and/or the power being applied to the driven wheel 804. The display 826 may be any type of display known in the art. For example, the display may be an LED screen or an LCD screen. In one embodiment, the display 826 is connected to the cycle 800. In another embodiment, the display 826 is removable from the cycle 800. For example, the display may use a user's personal electronic device, such as a cellular phone or a digital media player, to display force and/or power.

Figure 9:
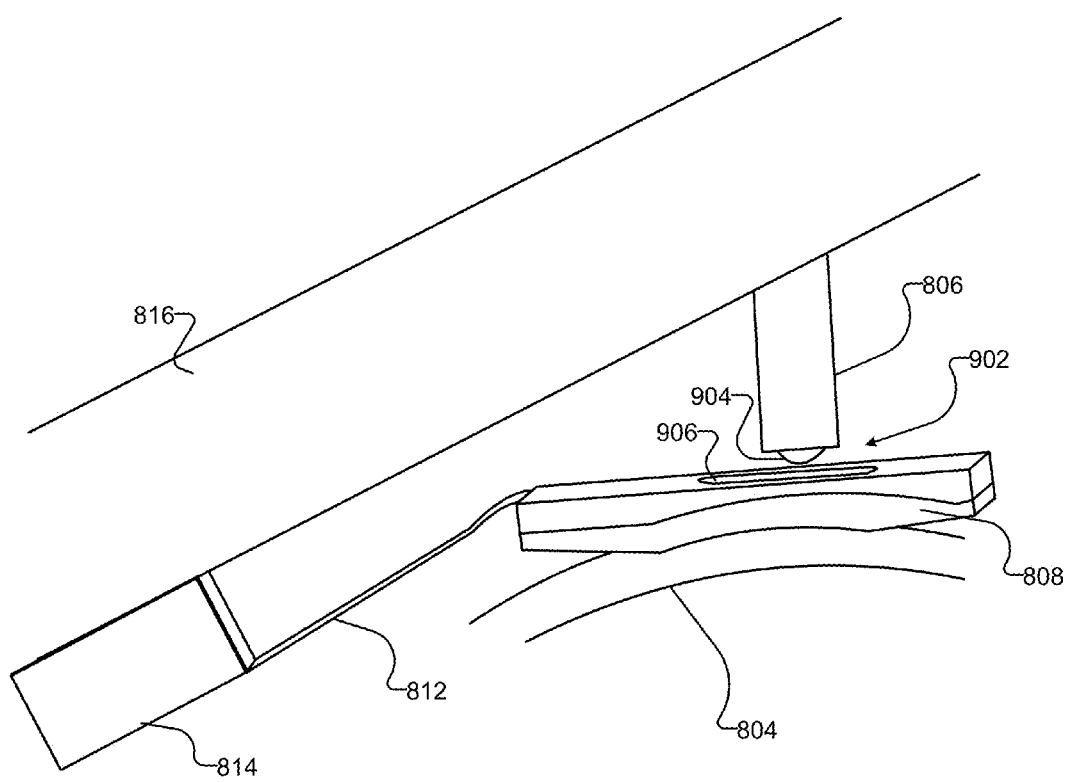
FIG. 9 depicts a side view of one embodiment of the force measurement system of FIG. 8.

FIG. 9 depicts a side view of one embodiment of the force measurement system 810 of FIG. 8. The force measurement system 810 includes the brake pad 808, the linkage 812, and the force sensor 814. In one embodiment, the adjustable brake actuator 806 interacts with the brake pad 808 via a linear bearing 902. The linear bearing 902 allows the brake pad 808 to move fore and aft under load from the adjustable brake actuator 806. This relative freedom of fore and aft movement allows tangential force imparted by the driven wheel 804 to be transmitted by the linkage 812 to the force sensor 814.

In one embodiment, the linear bearing includes a ball bearing 904 and a linear race 906. The ball bearing 904 may be disposed at an end of the adjustable brake actuator 806 that contacts the brake pad 808. The linear race 906 may be disposed on an upper surface of the brake pad 808 or on a bracket to which the brake pad 808 is mounted. The ball bearing 904 may roll or slide along the linear race 906.

Figure 10:
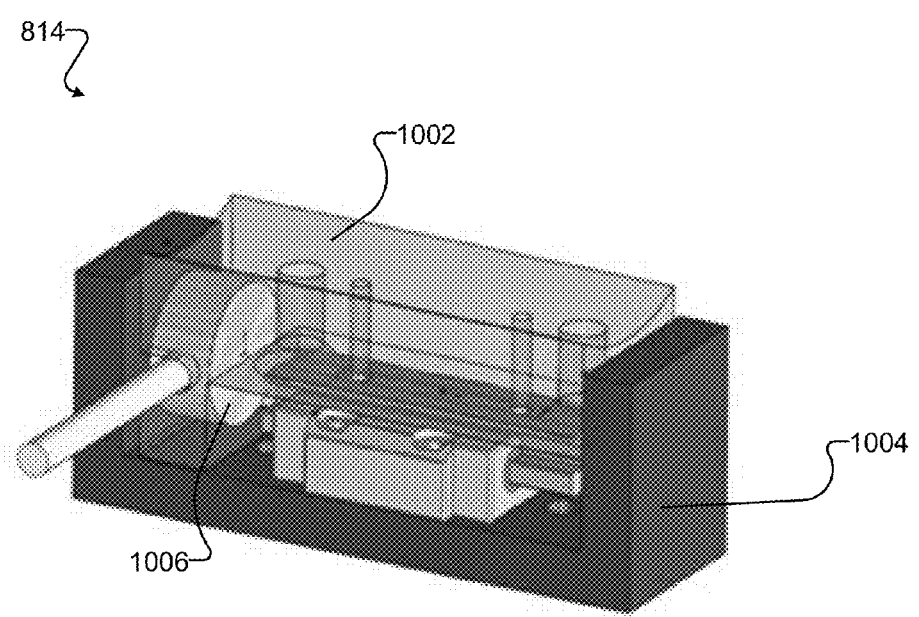
FIG. 10 depicts a perspective view of one embodiment of the force measurement sensor of FIG. 8.

FIG. 10 depicts a perspective view of one embodiment of the force sensor 814 of FIG. 8. The force sensor 814 includes a mounting bracket 1002, a carriage 1004, and a force transducer 1006. The force sensor 814 converts a force input at the carriage 1004 into an electrical signal proportional to the force input.

The mounting bracket 1002, in one embodiment, is mountable to the down tube 816 of the frame 802. The mounting bracket 1002 provides a secure platform for mounting the other components of the force sensor 814. In one embodiment, the mounting bracket 1002 is secured to the frame 802 using bolts or screws. In another embodiment, the mounting bracket 1002 is welded to the frame 802.

The carriage 1004 is slideably connected to the mounting bracket 1002 and fixedly connected to the linkage 812. The carriage 1004 may slide fore and aft relative to the mounting bracket 1002. The linkage 812 may be secured to the carriage 1004 via a fastener, welded to the carriage 1004, secured to the carriage 1004 via an adhesive, or formed integrally with the carriage 1004.

The force transducer 1006, in one embodiment, is a transducer that converts a force into an electrical signal. The force transducer 1006 may use any type of known force transducer, including, but not limited to, a strain-gauge force transducer, a piezo force transducer, a hydraulic or hydrostatic force transducer, a resistive force transducer, a capacitive force transducer, or a load cell.

In some embodiments, the force transducer 1006 is placed between a component of the mounting bracket 1002 and a component of the carriage 1004. As force is applied to the carriage 1004, the carriage applies force to the force transducer 1006 and the mounting bracket 1002 provides a reactive force to the force transducer 1006.

Figure 11:
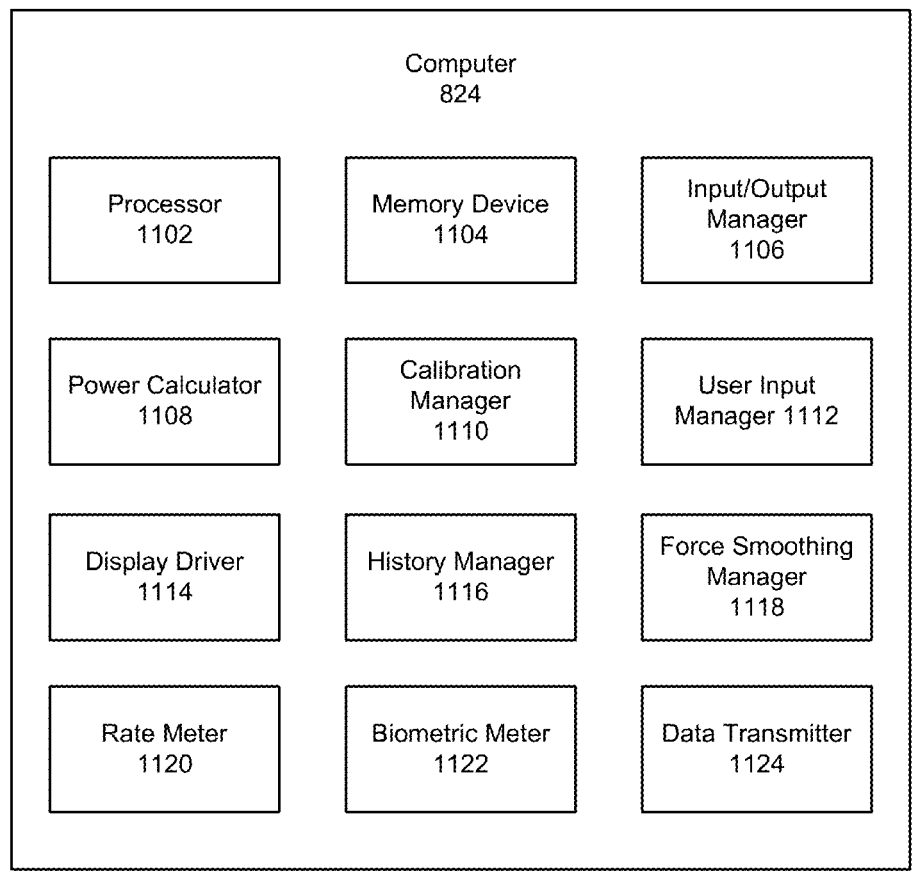
FIG. 11 is a block diagram depicting one embodiment of the computer of FIG. 8.

FIG. 11 is a block diagram depicting one embodiment of the computer 824 of FIG. 8. The computer 824, in one embodiment, includes a processor 1102, a memory device 1104, an input/output manager 1106, a power calculator 1108, a calibration manager 1110, a user input manager 1112, a display driver 1114, a history manager 1116, a force smoothing manager 1118, a biometric meter 1122, and a data transmitter 1124. The computer 824 computes power generated by a user of the cycle 800.

The processor 1102, in one embodiment, is a hardware component that executes instructions of a computer program. The processor 1102 may be any known or future processor capable of executing the functions of the computer 824. For example, the processor may be a microprocessor, a central processing unit (CPU) a very-large-scale integration (VLSI) integrated circuit (IC), or a digital signal processor (DSP). The processor 1102 may be programmed to perform the functions of the computer 824.

In some embodiments, the memory device 1104 stores information for use by the computer 824. The memory device 1104 may be any type of known or future computer memory. For example, the memory device 1104 may be or include a volatile memory, a non-volatile memory, random access memory (RAM), flash memory, or a read-only memory (ROM). The information stored by the memory device 1104 may include sensor data, program data, calculated data, user input data, or any other data used by the computer 824.

The input/output manager 1106, in one embodiment, manages inputs of data to and outputs of data from the computer 824. The input/output manager 1106 may include hardware, software, or a combination of hardware and software. Inputs managed by the input/output manager 1106 may include force sensor inputs, RPM sensor inputs, user inputs, or other inputs. Outputs managed by the input/output manager 1106 may include raw outputs and calculated outputs.

The power calculator 1108, in one embodiment, calculates power using one or more inputs to the computer 824. The power calculator 1108 may use any method or formula for calculating power. For example, the power calculator 1108 may calculate power by inferring a tangential force at the brake pad 808 using the input force signal, multiplying that inferred force by a constant related to the diameter of the driven wheel 804 to infer torque, and multiplying inferred torque by an inferred angular velocity of the driven wheel inferred from the RPM signal provided by the RPM sensor 822. In another embodiment, the power calculator 1108 uses calibration factors derived by the calibration manager 1110 to determine power. In yet another embodiment, the power calculator 1108 uses a lookup table to infer power based on the force signal and the RPM signal. The power calculator 1108 may calculate power using any measure of power, and may calculate power in multiple measures of power. For example, the power calculator 1108 may calculate power in terms of watts and calories per hour.

In some embodiments, the calibration manager 1110 allows a user or a technician to calibrate the inputs and/or outputs of the computer 824. For example, the calibration manager 1110 may enter a calibration mode where a user is instructed to input his or her weight, place a crank arm of the cycle 800 in a horizontal position, engage the adjustable brake actuator 806 such that the driven wheel 804 will not turn, and place all of his or her weight on the pedal of the cycle 800. The calibration manager 1110 may use this information to infer a torque produced at the crank arm and correlate that torque to the input from the force sensor. The computer 824 may use this calibration information to calibrate the outputs of the computer 824.

The user input manager 1112, in one embodiment, manages inputs from a user. For example, the user input manager 1112 may receive inputs including physical characteristics of the user and desired outputs of the computer 824. The user input manager 112 may receive inputs from a user input device, such as a keypad or a keyboard.

The display driver 1114, in some embodiments, controls output of the computer to a display 826. The display driver 1114 may manage output to one or more LCD, LED, or other displays. For example, the display driver 1114 may control one or more multi-segment LED displays. In another example, the display driver 1114 may control an output to an LCD screen.

In one embodiment, the history manager 1116 manages data received or inferred by the computer 824 over time. The history manager 1116 may make historical data available to the computer 824 for additional calculations. For example, the history manager 1116 may manage storage of data during a workout to compute average power and total power at the end of the workout.

The force smoothing manager 1118, in one embodiment, smoothes the output from the force transducer 1006 to reduce ringing or hysteresis effects. Many force transducers are subject to ringing and/or hysteresis during load changes. Since pedaling a bicycle necessarily results in regular abrupt load changes on the driven wheel, ringing and hysteresis effects may be exhibited by the output of the force transducer 1006. The force smoothing manager 1118 may use mathematical and/or historical data to smooth the output of the force transducer 1006 and attempt to dampen inaccurate force readings resulting from ringing and/or hysteresis.

In some embodiments, the rate meter 1120 determines a rate at which an exercise apparatus is operated. The rate meter 1120 may receive an input signal that is related to the rate and compute a rate from the input signal. For example, the input signal may be produced by an optical sensor (not shown). In another example, the input signal may be produced by a magnetic sensor (not shown). In another example, the input signal may be produced by a generator that produces electrical power as the exercise apparatus is operated. An example of an input signal produced by a generator is described below in relation to FIG. 25.

The rate meter 1120 may determine the rate from the input signal by directing the processor 1102 to perform an operation on the input signal. For example, the processor 1102 may interpret the input signal and apply a calculation based on a gear ratio, sampling rate, or other parameter of the exercise apparatus to determine the rate. In some embodiments, the rate calculated by the processor 1102 may be an estimate of a rate of action by a user of the exercise apparatus is operated, such as cadence, RPM, or speed (such as miles per hour or kilometers per hour).

In some embodiments, the biometric meter 1122 may receive an input relating to one or more biometric parameters from a user. For example, the biometric meter 1122 may receive a signal related to the heart rate of the user. The biometric meter 1122 may calculate, display, and/or use the signal to estimate a biometric parameter of the user. The computer 824 may use this estimated biometric parameter to modify the function of the exercise device. The biometric meter 1122 may be part of a system that includes a sending unit attached to or in contact with the user, and may conform to any standard known in the art. For example, in one embodiment, the biometric meter 1122 may be part of an ANT+ FIT1e interface.

The data transmitter 1124, in some embodiments, transmits data from the computer to another device. For example, the data transmitter 1124 may transmit information about a workout to a device of the user. The data transmitter 1124 may conform to any standard. For example, the data transmitter 1124 may be a Bluetooth transmitter or part of an ANT+ FIT1e system.

The computer 824 may be electrically powered by a power source. In some embodiments, the computer 824 is powered by current provided by an electrical outlet into which a power cord of the cycle 800 is plugged. In another embodiment, the computer 824 is battery powered. In some embodiments, the computer 824 is powered using power generated by a generator operating on the cycle 824. One example of a generator is described below in relation to FIG. 12.

Figure 12:
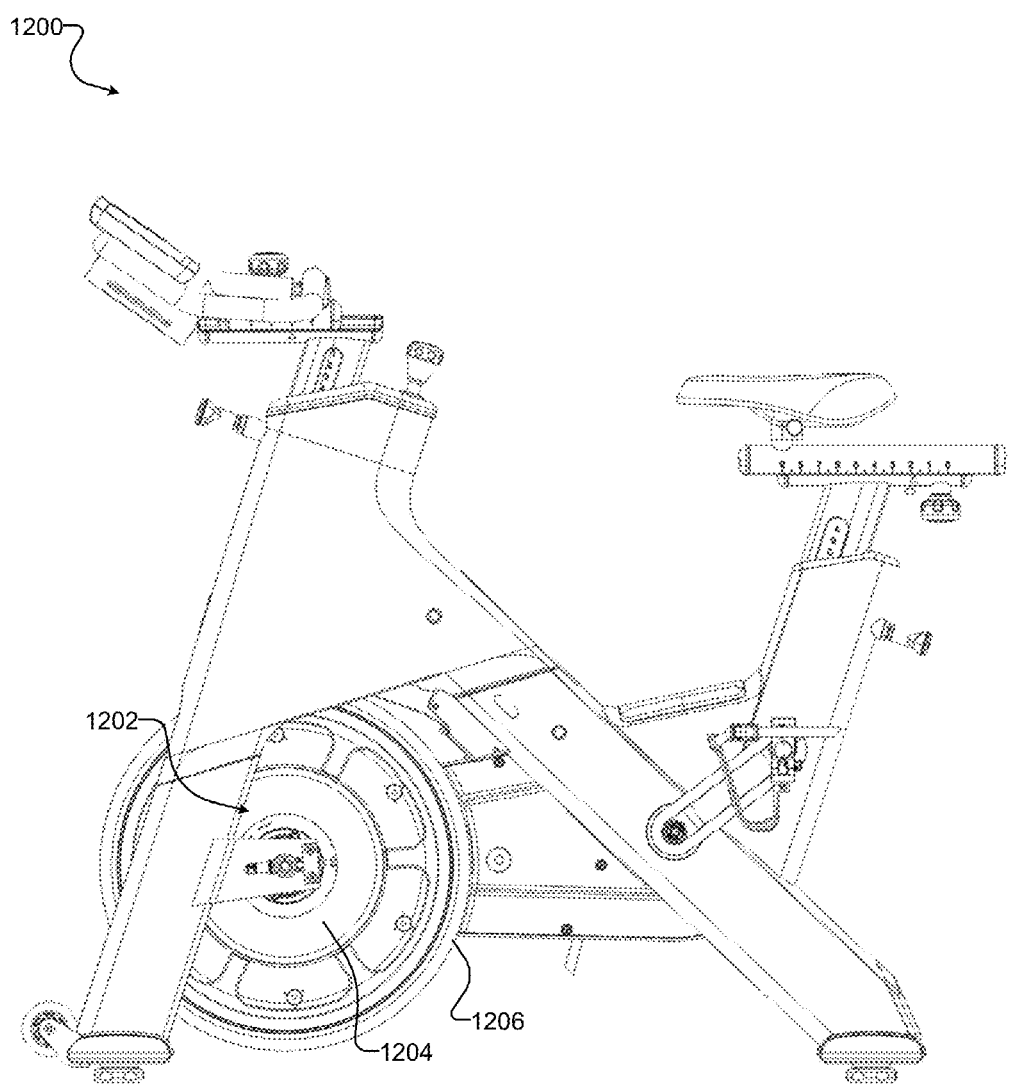
FIG. 12 depicts a side view of one embodiment of a cycle having a power generation system.

FIG. 12 depicts a side view of one embodiment of a cycle 1200 having a power generation system 1202. The power generation system 1202, in one embodiment, includes a generator 1204 mounted at an axle of a driven wheel 1206. Rotation of the driven wheel 1206 turns a rotor of the generator 1204 to produce electrical energy. The electrical energy produced by the generator 1204 may be used to power other components of the cycle 1200, such as a display 826 and a computer 824.

The generator 1204 may be any type of device capable of converting mechanical energy into electrical energy. For example, the generator 1204 may be an alternator, a dynamo, a singly-fed generator, a doubly-fed generator, or an induction generator.

In some embodiments, the generator 1204 includes a sensor that detects the rotation of the driven wheel 1206. The sensor may output a signal that indicates the rotation of the driven wheel 1206. For example, the generator 1204 may output a signal pulse where each pulse indicates one rotation of the driven wheel 1206. In another embodiment, characteristics of the electrical energy produced by the generator 1204 indicate the rotational speed of the driven wheel 1206. In either case, a computer 824 may infer a rotational speed from the output of the generator 1204.

In one embodiment, the generator 1204 provides an alternating current (AC) signal to the computer 824. The AC current has a waveform that has, among other characteristics, a period. The period of the AC waveform, in some embodiments, is related to the speed of rotation of a rotating component of the exercise equipment, such as a flywheel connected to the generator. The computer 824 may determine the period of the AC waveform supplied by the generator 1204 and derive from this period a rate for display, such as cadence (e.g. revolutions of a crank per minute), rpm, speed, or another rate.

Because the period of the waveform produced by the generator 1204 is directly related to the speed of a rotating component, and other characteristics of the exercise apparatus, such as gear ratios, and generator characteristics, are well known, rates can be calculated from the waveform with a high degree of accuracy. In some embodiments, the waveform supplied by the generator 1204 is further conditioned to ease determining the period. For example, the waveform may be converted from a sine wave to a square wave of the same period and digitally sampled.

Figure 13:
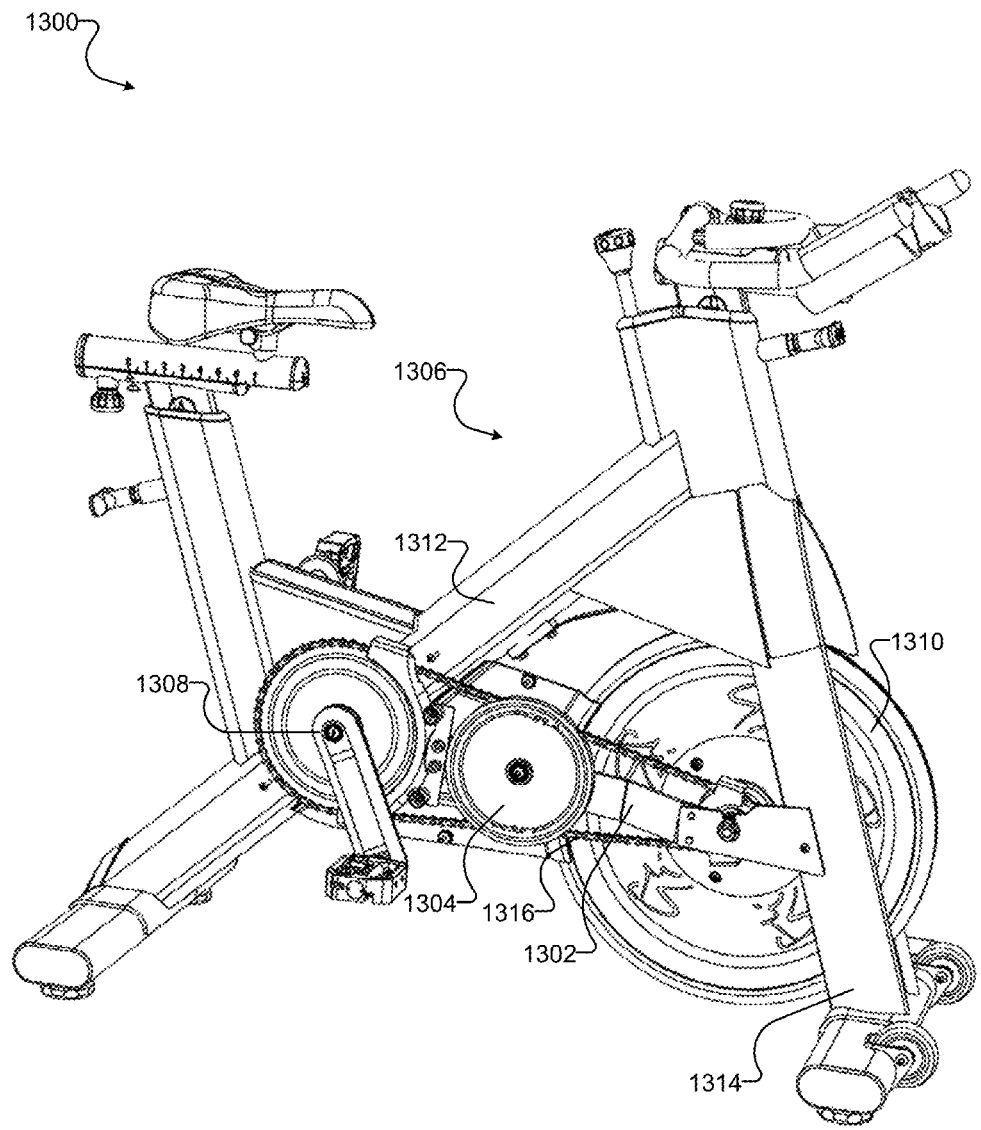
FIG. 13 depicts a perspective view of one embodiment of a cycle having a frame stiffener and a chain tensioner.

FIG. 13 depicts a perspective view of one embodiment of a cycle 1300 having a frame stiffener 1302 and a chain tensioner 1304. The cycle, in one embodiment, has a frame 1306, a crank 1308, and a driven wheel 1310. The frame 1306 supports the other components of the cycle 1300 and is similar to other frames (102, 112, 802) described above. The driven wheel 1310 is rotatably connected to the frame 1306. The crank 1308 is rotatably connected to the frame 1306 and operatively connected to the driven wheel 1310 such that rotation of the crank 1308 causes rotation of the driven wheel 1310.

In some embodiments, the frame 1306 further comprises a down tube 1312 and a fork 1314. The down tube 1312 runs between the fork 1314 and the crank 1308. The fork 1314 includes a connection for the driven wheel 1310. In some embodiments, heavy use of the cycle 1300 places significant stress on the connection between the down tube 1312 and the fork 1314. This stress can lead to undesirable frame flex, which can have a negative impact on performance characteristics of the cycle 1300 and can lead to failure of the connection between the down tube 1312 and the fork 1214.

In some embodiments, the cycle 1300 includes the frame stiffener 1302 to reduce frame flex at the down tube 1312 to fork 1314 connection. The frame stiffener 1302 is described in greater detail in relation to FIG. 14 below.

The crank 1308 is operatively connected to the driven wheel 1310 by a flexible member 1316. The flexible member 1316 may be any type of member capable of transmitting rotational energy from the crank 1308 to the driven wheel 1310. For example, the flexible member 1316 may be a chain, a belt, a cable, or another flexible power transmission device. In another embodiment, the crank 1308 is operatively connected to the driven wheel 1310 by a non-flexible member, such as a shaft, a gear, a gear train, or any other power transmission device. In some embodiments, the flexible member 1316 encircles the frame stiffener 1302. In other words, the frame stiffener 1302 passes through a plane defined by the flexible member 1316.

In some embodiments, the flexible member 1316 is susceptible to wear that changes the length of the flexible member 1316. As the flexible member 1316 changes length, its performance is impeded. For example, a chain will stretch over time as the cycle 1300 is used. As the chain stretches, it becomes susceptible to disengagement from one or more sprockets and other undesirable effects.

To prevent undesirable effects of changing length of the flexible member 1316, the cycle 1300, in some embodiments, includes the tensioner 1304. The tensioner is described in greater detail in relation to FIG. 15 below.

Figure 14:
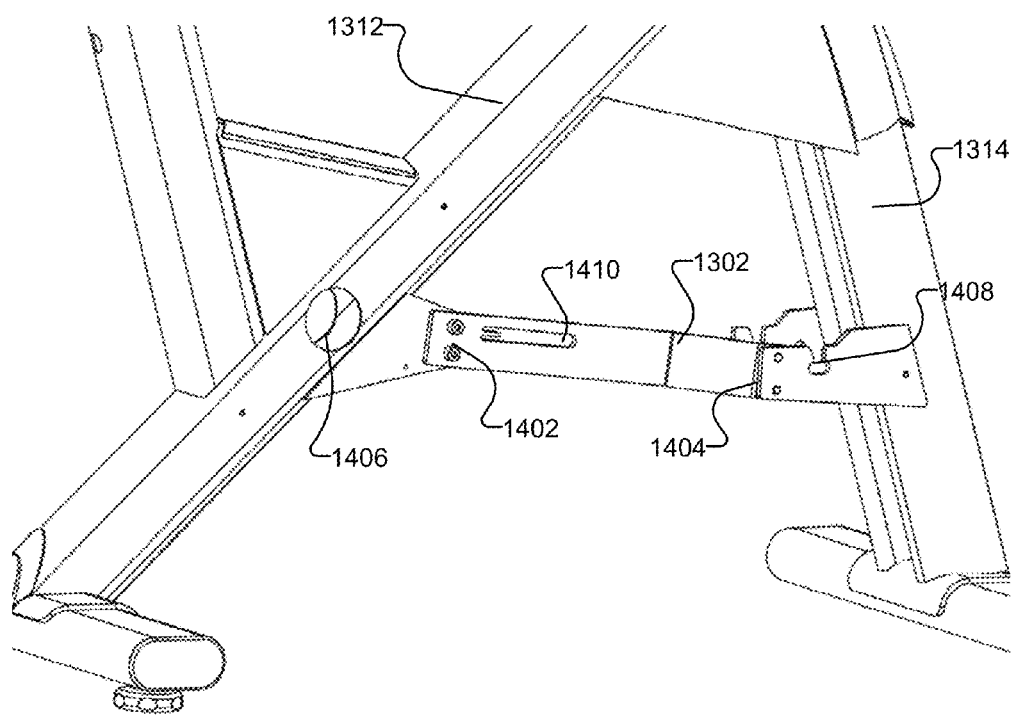
FIG. 14 depicts a perspective view of one embodiment of the frame stiffener of FIG. 13.

FIG. 14 depicts a perspective view of one embodiment of the frame stiffener 1302 of FIG. 13. The frame stiffener 1302, in one embodiment, is connected at a first end 1402 to the down tube 1312 near a crank hanger 1406. The frame stiffener 1302 is connected at a second end 1404 to the fork 1314 near a driven wheel dropout 1408. The frame stiffener 1302 carries much of the force that would otherwise be transmitted through the connection between the down tube 1312 and the fork 1314.

In one embodiment, the frame stiffener 1302 includes a removable connection at the first end 1402 and/or the second end 1404, such as with a bolt or bolts. In another embodiment, the frame stiffener 1302 includes a permanent connection at the first end 1402 and/or the second end 1404, such as with welding or integral forming with the elements of the frame 1306. In one embodiment, the frame stiffener 1302 is removeably connected to the down tube 1312 at the first end 1402 and the fork 1314 second end 1404 using bolts. In an alternate embodiment, the frame stiffener 1302 is welded to the down tube 1312 at the first end 1402 and the fork 1314 second end 1404.

In some embodiments, the frame stiffener 1302 includes a transit slot 1410 for use with a tensioner 1304. The tensioner 1304 is described in greater detail in relation to FIG. 15 below.

Figure 15:
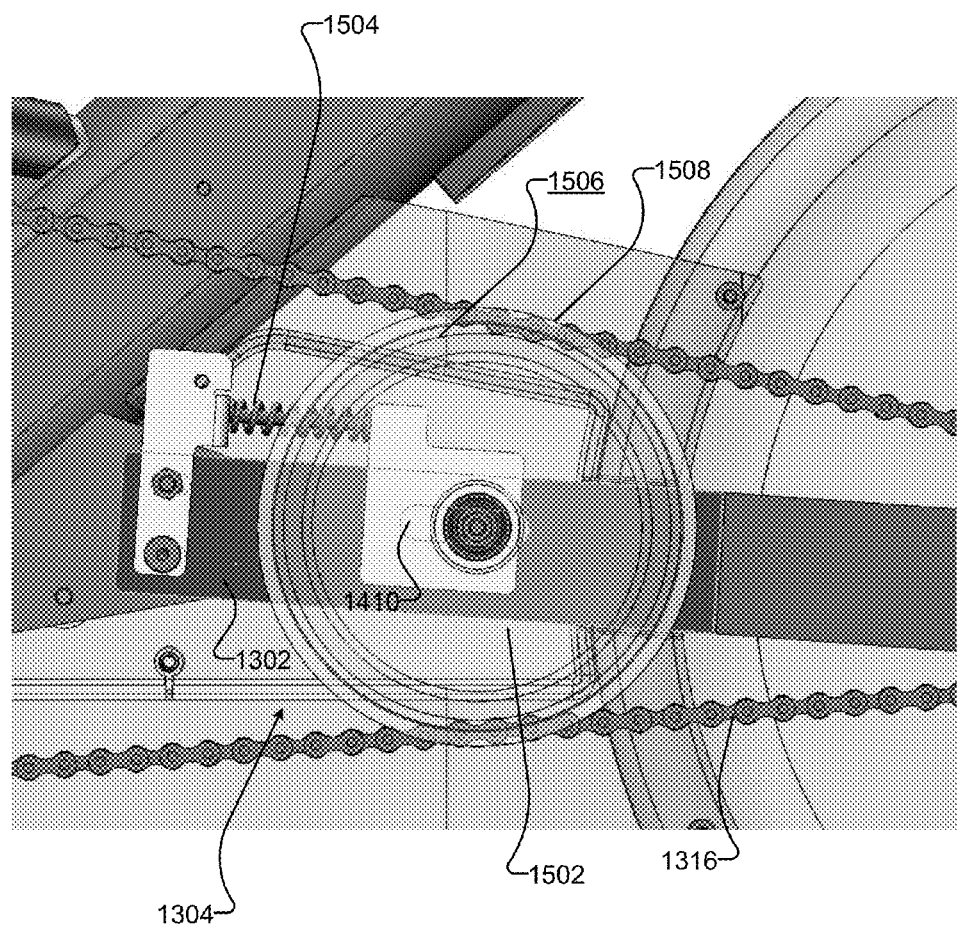
FIG. 15 depicts a side view of one embodiment of the tensioner of FIG. 13.

FIG. 15 depicts a side view of one embodiment of the tensioner 1304 of FIG. 13. The chain tensioner 1304 includes a pulley 1502 and a biasing member 1504. The tensioner 1304 maintains an appropriate tension in the flexible member 1316 as the flexible member 1316 changes length due to wear.

The pulley 1502 may be a circular structure with a tangential surface 1506 for supporting the flexible member 1316. In some embodiments, the pulley includes one or more retaining flanges 1508 to retain the flexible member 1316 on the tangential surface 1506. The tangential surface 1506 may be smooth, may include gear teeth, or may have another shape.

The pulley 1502, in one embodiment, is rotatably connected to the frame stiffener 1302. The pulley 1502 may be rotatable as the flexible member 1316 transits across the tangential surface 1506. In some embodiments, the flexible member 1316 contacts the pulley 1502 at two substantially opposing sides of the pulley 1502.

In some embodiments, the pulley 1502 is slideably connected to the frame stiffener 1302 via the transit slot 1410. The pulley 1502 may be moveable in a linear direction along the transit slot 1410. The pulley 1502, in one embodiment, is moveable fore and aft in the transit slot 1410. In some embodiments, the tensioner 1304 includes the biasing member 1504 to apply force to the pulley 1502 along the transit slot 1410. The biasing member 1504 may be any type of structure capable of applying force to the pulley 1502. For example, in one embodiment, the biasing member is a spring.

In an alternative embodiment, the pulley 1502 is positionable relative to the transit slot 1410 via a turnbuckle (not shown). The turnbuckle may be rotated to adjust the position of the pulley 1502 relative to the transit slot 1410.

The force applied by the biasing member 1504 to the pulley 1502 may be transmitted by the pulley 1502 to the flexible member 1316. As the flexible member 1316 changes length, the biasing member 1504 may change the position of the pulley 1502 relative to the transit slot 1410 to maintain a desirable tension in the flexible member 1316.

The pulley 1502, in certain embodiments, is both rotatably and slideably connected to the frame stiffener 1302. The pulley 1502 may rotate in response to movement of the flexible member 1316 and move along the transit slot in response to a change in the length of the flexible member 1316.

Figure 16:
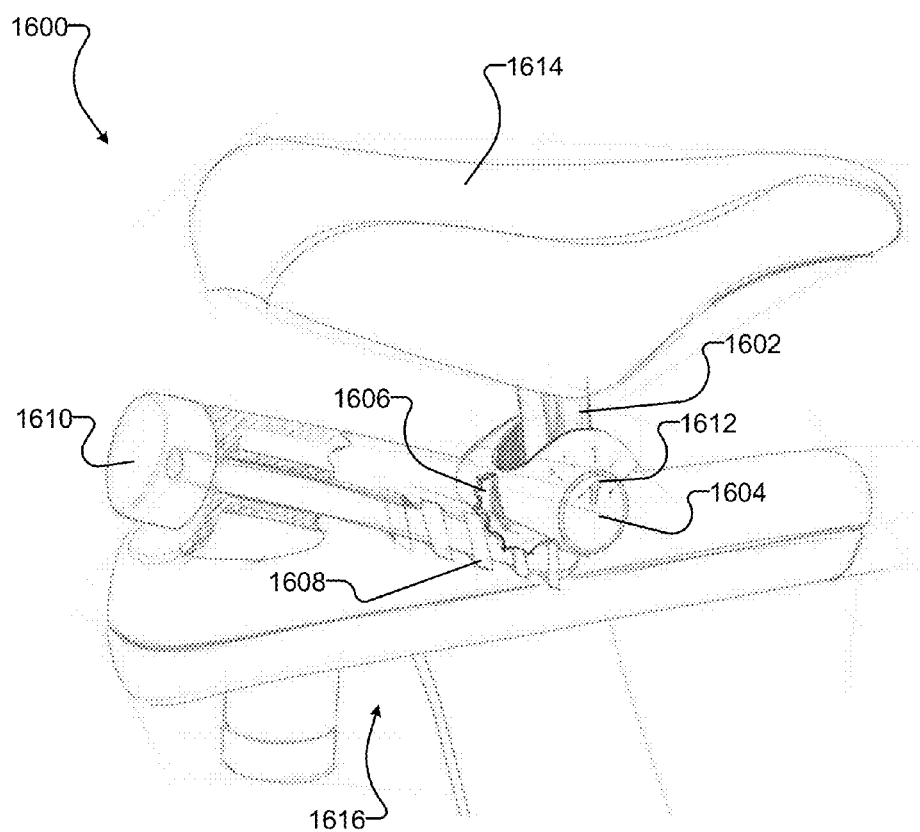
FIG. 16 depicts a perspective view of one embodiment of a saddle angle adjustment system.

FIG. 16 depicts a perspective view of one embodiment of a saddle angle adjustment system 1600. The saddle angle adjustment system 1600 includes an upper seat post 1602, a pivot 1604, a sector gear 1606, a worm gear 1608, an actuator 1610, and an angle indicator 1612. The saddle angle adjustment system 1600 adjusts the angle of a saddle 1614.

In one embodiment, the upper seat post 1602 is a post that connects to the saddle 1614. The upper seat post 1602 may be any shape or configuration or consist of any material strong and rigid enough to support the saddle 1614. For example, the upper seat post 1602 may be a steel tube.

The upper seat post 1602, in some embodiments, is connected to a pivot 1604. The pivot 1604 may allow the upper seat post 1602 to pivot relative to other components of a cycle. The pivot 1604 may pivot around an axis running in a medial-lateral direction. The pivot 1604 may be any type of pivot capable of rotating and of supporting the saddle 1614 while in use. For example, the pivot 1604 may be a steel axle or spindle.

The sector gear 1606, in one embodiment is connected to the upper seat post 1602. The sector gear 1606 runs in a fore-aft direction and rotates with the upper seat post 1602 around the pivot 1604. Rotation of the sector gear 1606 in one direction causes the saddle 1614 to rotate in a "nose down" direction, while rotation of the sector gear 1606 in the other direction causes the saddle 1614 to rotate in a "nose up" direction.

The worm gear 1608, in one embodiment, interfaces with the sector gear 1606 such that rotation of the worm gear 1608 around an axis perpendicular to axis of the pivot 1604 causes the sector gear 1606 to rotate around the pivot 1604. The interface between the worm gear 1608 and the sector gear 1606 may have frictional components such that force exerted by the worm gear 1608 on the sector gear 1606 will move the sector gear 1606, but force exerted by the sector gear 1606 on the worm gear 1608 will not move the worm gear 1608. Such configurations where the sector gear 1606 cannot drive the worm gear 1608 are called "self-locking."

The actuator 1610, in one embodiment, provides a graspable lever for turning the worm gear 1608. The actuator 1610 may be connected to the worm gear 1608 along a common shaft, such that turning the actuator 1610 turns the worm gear 1608, which, in turn, turns the sector gear 1606. The actuator 1610 may be positioned behind the saddle 1614 at a distance that allows access to the actuator 1610 at any position or angle of the saddle 1614.

In some embodiments, the angle indicator 1612 is connected to the pivot 1604 and rotates around a common axis with the pivot 1604. The angle indicator 1612 may include one or more markings on the angle indicator 1612 and one or more markings on an adjacent structure that does not rotate with the pivot 1604. Comparing a marking on the angle indicator 1612 to a marking on the adjacent structure allows a user to determine the angle of the saddle 1614.

The saddle angle adjustment system 1600 in some embodiments, mounts to a cycle. In one embodiment, the saddle angle adjustment system 1600 mounts atop a saddle fore-aft adjustment system 1616.

Figure 17:
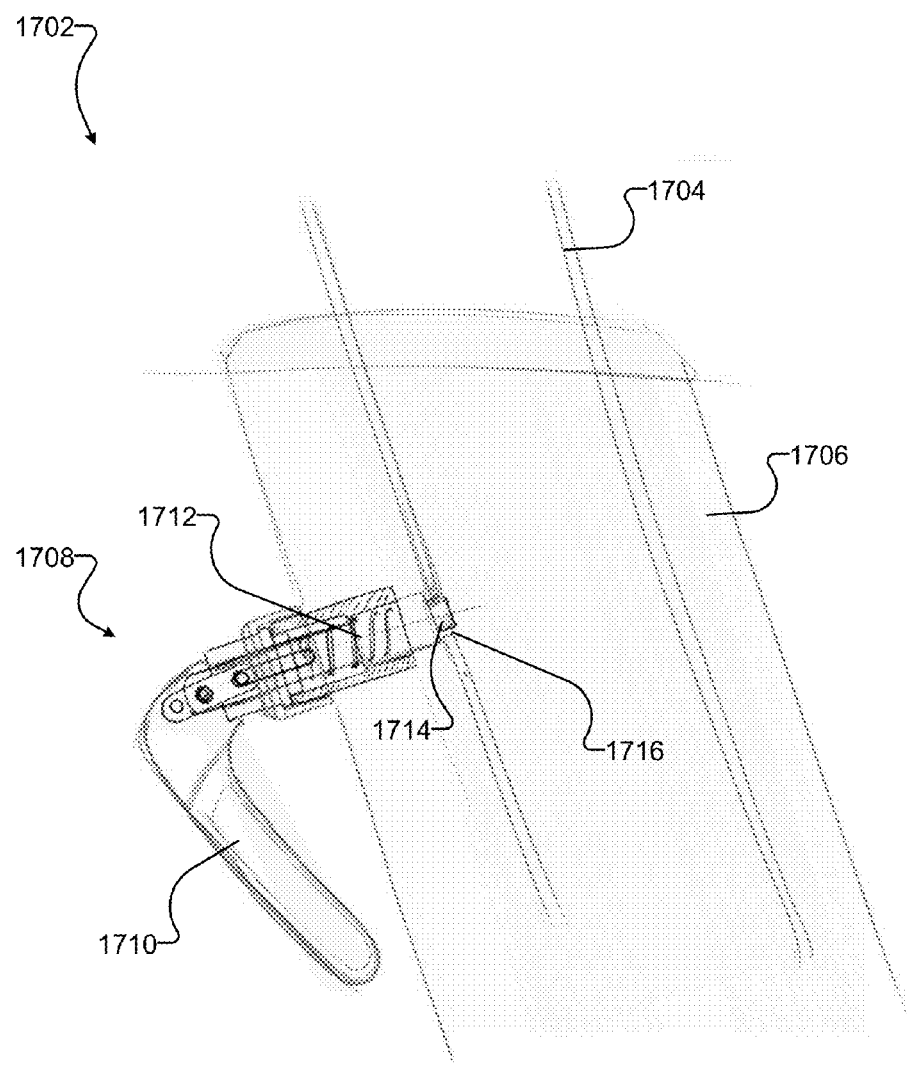
FIG. 17 depicts a side view of one embodiment of a seat post quick release.

FIG. 17 depicts a side view of one embodiment of a seat post quick release 1702. The seat post quick release 1702 includes a seat post 1704, a seat tube 1706, and a quick release 1708. Actuation of the quick release 1708 allows a user to release the seat post 1704 relative to the seat tube 1706 to adjust the height of a saddle.

The seat post 1704, in one embodiment, slides within a seat tube 1706 of a cycle. The seat post 1704 has a cross section that matches a cross section of an interior of the seat tube 1706 such that the seat post 1704 slides within the seat tube 1706. The seat post 1704 is adjustable in a roughly "up" or a roughly "down" direction relative to the seat tube 1706 to adjust a height of a saddle by sliding within the seat tube 1706.

In some embodiments, the seat post 1704 is releaseably secured relative to the seat tube 1706 by the quick release 1708. The quick release 1708, when actuated, allows the seat post 1704 to slide relative to the seat tube 1706 to adjust saddle height. When not actuated, the quick release 1708 secures the seat post 1704 at a position relative to the seat tube 1706. The quick release 1708 is connected to the seat tube 1706.

The quick release 1708, in some embodiments, includes a lever 1710, a biasing member 1712, and a pin 1714. The lever 1710, in one embodiment, is accessible by a user and may be manipulated to actuate the quick release 1708. The lever 1710 may rotate around a pivot and move other components of the quick release 1708.

In some embodiments, the lever 1710 is connected to the pin 1714. The pin 1714 extends through the seat tube 1706 and engages the seat post 1704. When actuated, the lever 1710 draws the pin 1714 out of engagement with the seat post 1704. When engaged with the seat post 1704, the pin 1714 restricts movement of the seat post 1704 relative to the seat tube 1706. When the pin 1714 is not engaged with the seat post 1704, the seat post 1704 is free to slide relative to the seat tube 1706.

The biasing member 1712, in some embodiments, engages the pin 1714. The biasing member 1712 may apply a force to the pin 1714 to cause the pin 1714 to engage the seat post 1704 in response to the lever 1710 not being actuated. The biasing member 1712 may be any type of structure or device capable of applying force to the pin 1714. For example, the biasing member 1712 may be a spring. In certain embodiments, the biasing member 1712 acts as a secondary safety mechanism to hold the seat post 1704 at a given height when the lever 1710 is not locked down.

In certain embodiments, the seat post 1704 includes one or more detents 1716 engageable by the pin 1714. The detents 1716 may be depressions or holes in the seat post 1704 positioned such that the pin 1714 may engage the detents 1716 at various seat post heights. The detents 1716 may be spaced regularly or irregularly along the seat post 1704. For example, the detents 1716 may be placed one inch apart along the seat post 1704.

Figure 18:
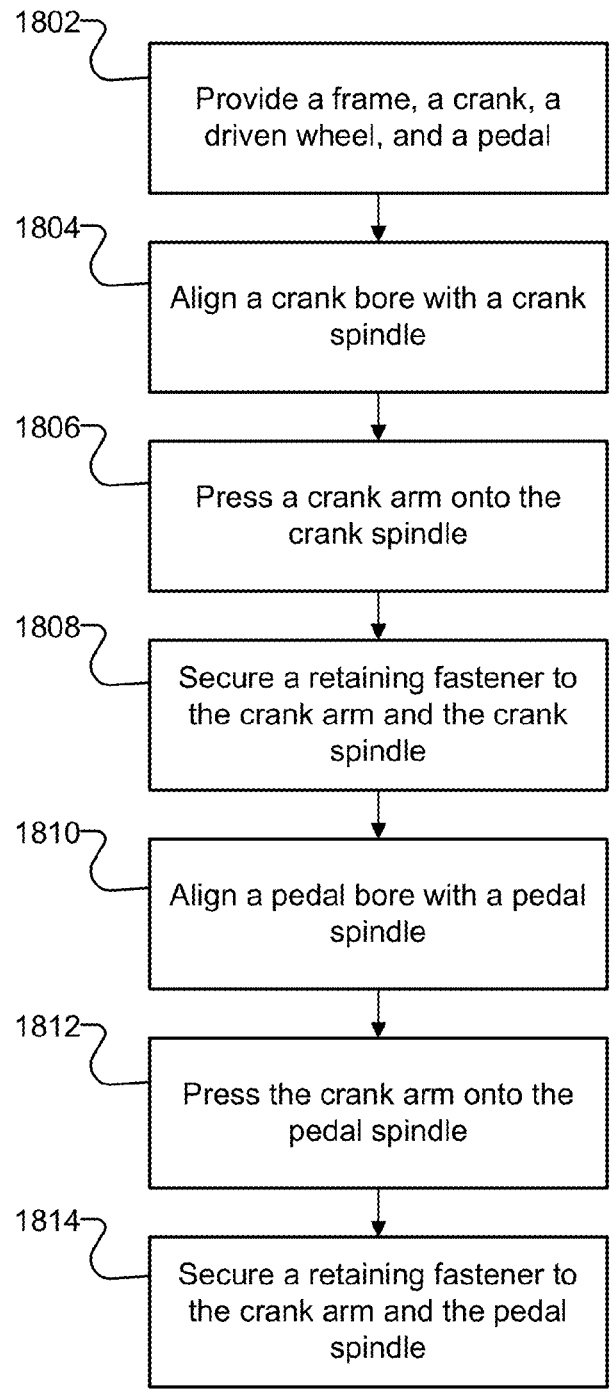
FIG. 18 depicts a flowchart diagram showing one embodiment of a method for assembling cycle drivetrain components having one or more tapered connections.

FIG. 18 depicts a flowchart diagram showing one embodiment of a method 1800 for assembling cycle drivetrain components having one or more tapered connections. The method 1800 is in certain embodiments a method of use of the system and apparatus of FIGS. 1A-7B, and will be discussed with reference to those figures. Nevertheless, the method 1800 may also be conducted independently thereof and is not intended to be limited specifically to the specific embodiments discussed above with respect to those figures.

As shown in FIG. 18, a frame 102, a crank 104, a driven wheel 106, and a pedal 602 are provided 1802. In certain embodiments, the crank 104 includes a crank spindle 202 with a taper and a crank arm 204 with a tapered crank bore 402. The pedal 602, in some embodiments, includes a pedal spindle 606 with a taper and the crank arm 204 has a tapered pedal bore 404.

The crank bore 402 is aligned 1804 with the crank spindle 202. Alignment 1804 may be accomplished manually or with the use of one or more jigs to hold the crank arm 204 and the crank spindle 202 in a proper position. In some embodiments, the crank bore 402 is aligned 1804 with the crank spindle 202 using a keyway on the crank bore 402 and a keyway on the crank spindle 202.

In certain embodiments, the crank arm 204 is pressed 1806 onto the crank spindle 202 such that the crank bore 402 and the crank spindle 202 are in interference contact. The crank arm 204 may be pressed 1806 onto the crank spindle 202 using a mechanical press. The mechanical press may be any type of press capable of applying sufficient pressure to achieve the required interference fit. For example, the mechanical press may be a hydraulic press, a servo press, or an arbor press.

In an alternative embodiment, the crank arm 204 is connected to the crank spindle 202 using a fastener 212. Tightening the fastener 212, in one embodiment, draws the crank arm 204 into interference contact with the crank spindle 202.

A retaining fastener 212 is secured 1808 to the crank arm 204 and the crank spindle 202. The retaining fastener 212 may be a bolt, a lock ring, or another type of fastener 212 capable of engaging and retaining the crank arm 204 and the crank spindle 202.

The pedal bore 404 is aligned 1810 with the pedal spindle 606. Alignment 1810 may be accomplished manually or with the use of one or more jigs to hold the crank arm 204 and the pedal spindle 606 in a proper position.

In certain embodiments, the crank arm 204 is pressed 1812 onto the pedal spindle 606 such that the pedal bore 404 and the pedal spindle 606 are in interference contact. The crank arm 204 may be pressed 1812 onto the pedal spindle 606 using a mechanical press. The mechanical press may be any type of press capable of applying sufficient pressure to achieve the required interference fit. For example, the mechanical press may be a hydraulic press, a servo press, or an arbor press.

In an alternative embodiment, the crank arm 204 is connected to the pedal spindle 606 using a fastener 610. Tightening the fastener 610, in one embodiment, draws the crank arm 204 into interference contact with the pedal spindle 606.

A retaining fastener 610 is secured 1814 to the crank arm 204 and the pedal spindle 606. The retaining fastener 610 may be a bolt, a lock ring, or another type of fastener 610 capable of engaging and retaining the crank arm 204 and the pedal spindle 606.

Figures 19, 20:
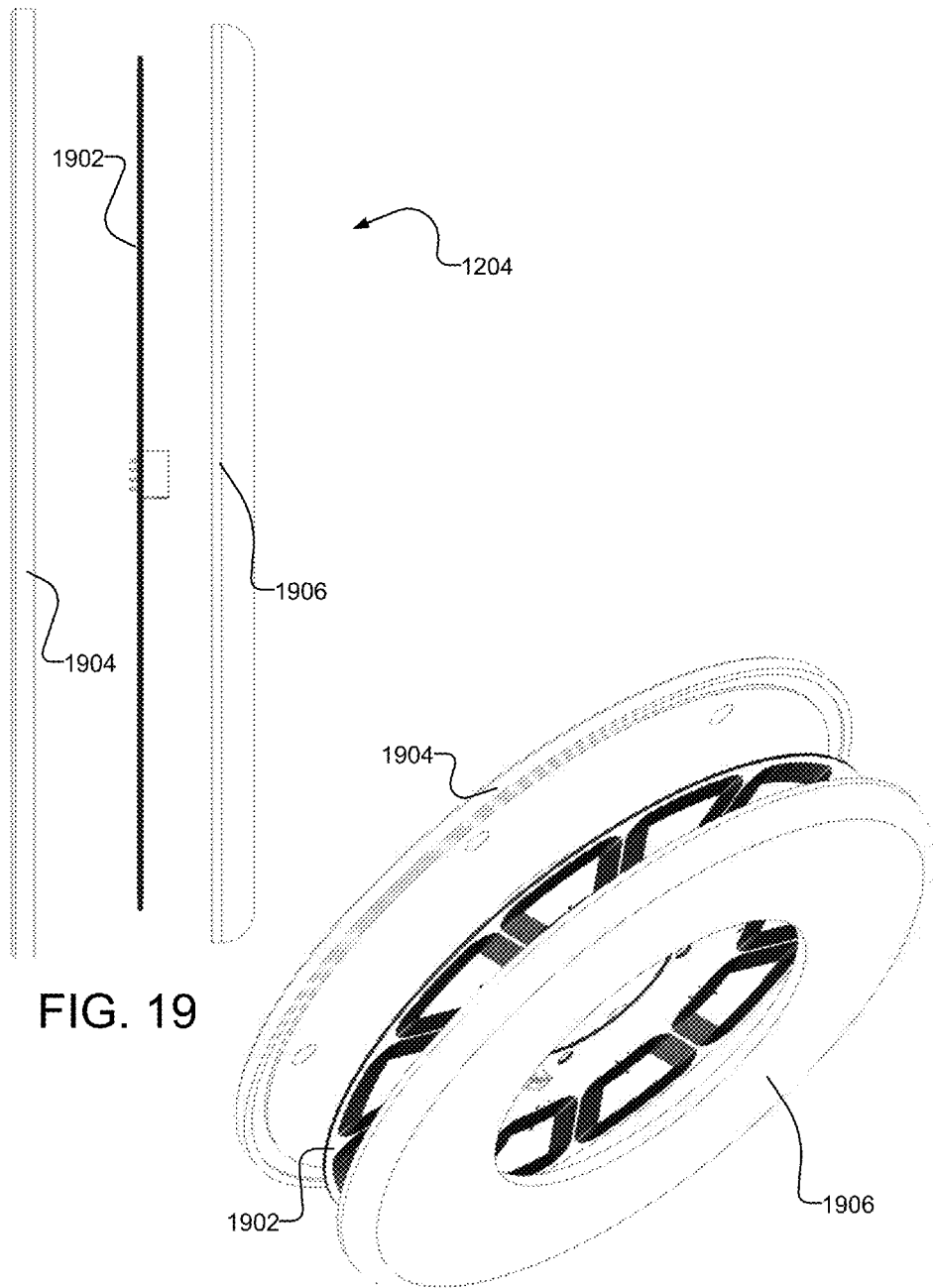
FIG. 19 depicts an exploded front view of one embodiment of the generator of FIG. 12.
FIG. 20 depicts an exploded perspective view of one embodiment of the generator of FIG. 12.

FIGS. 19 and 20 depict an exploded front view and an exploded perspective view of one embodiment of the generator 1204 of FIG. 12. The generator 1204 includes a stator 1902 and a rotor comprising a first rotor shell 1904 and a second rotor shell 1906. The generator 1204 generates electric power in response to use of the exercise apparatus.

In some embodiments, the stator 1902 is fixed relative to a frame of the exercise apparatus. The stator 1902 may include a plurality of induction coils or a plurality of permanent magnets. The rotor 1904, 1906 may include a plurality of permanent magnets or a plurality of induction coils. In one embodiment, the stator 1902 includes a plurality of induction coils and the rotor includes a plurality of permanent magnets. In another embodiment, the stator includes a plurality of permanent magnets and the stator includes a plurality of induction coils.

The stator 1902 and the rotor 1904, 1906 may be assembled and positioned such that the magnetic fields of one or more permanent magnets interact with one or more induction coils. The rotor 1904, 1906 may be rotatable relative to the stator 1902, such that the magnetic fields of the permanent magnets sweep across successive induction coils as the rotor 1904, 1906 rotates.

In one embodiment, the first rotor shell 1904 and the second rotor shell 1906 are assembled together to substantially surround the rotor 1902 and place the plurality permanent magnets in close proximity to the plurality of induction coils. The rotor 1904, 1906 may rotate freely relative to the stator 1902 when assembled.

Figure 21:
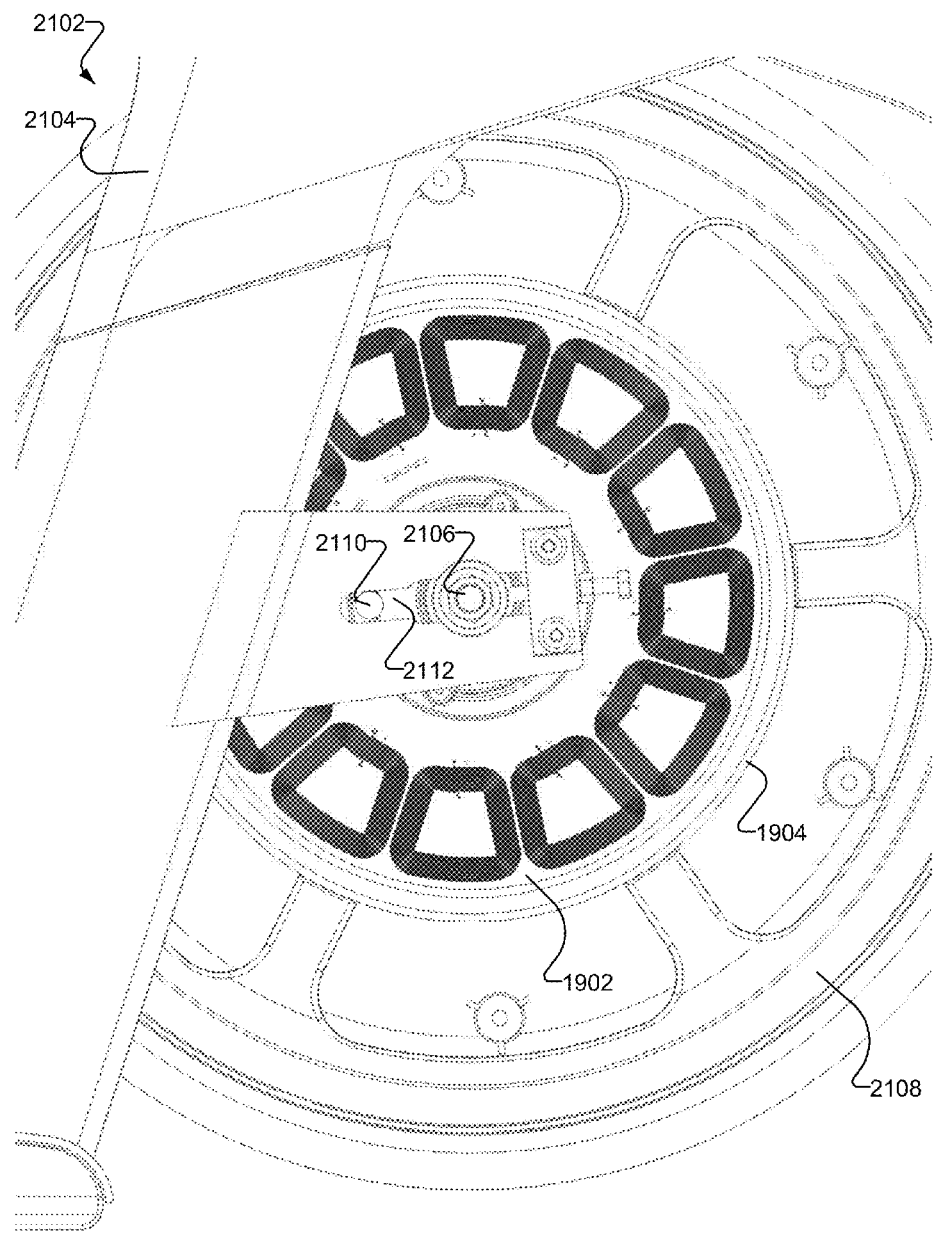
FIG. 21 depicts a side view of one embodiment of the stator of FIG. 19.

FIG. 21 depicts a side view of one embodiment of the stator 1902 of FIG. 19. The stator 1902 may be connected to a frame 2104 of an exercise apparatus 2102. In the embodiment illustrated in FIG. 21, the exercise apparatus 2102 is a stationary cycle. In an alternative embodiment, the exercise apparatus 2102 to which the generator 1204 is attached may be any type of exercise apparatus having a rotating component. For example, the generator 1204 may be used with a cycle, an elliptical machine, a stepper, a rowing machine, a treadmill, or any other type of exercise apparatus.

In some embodiments, the stator 1902 is connected to the frame 2104 an axle 2106 of a rotating component 2108. The rotating component 2108 may rotate relative to the stator 1902. The stator 1902 may be constrained in rotation relative to the frame 2104. In some embodiments, the stator 1902 is supported relative to the rotating component 2108 by a bearing (not shown) that allows the rotating component 2108 to rotate independently from the stator 1902.

In some embodiments, the stator 1902 is constrained in rotation relative to the frame 2104 by a constraint component 2110. The constraint component 2110 may be a projection that interferes with a component of the frame 2104. In the embodiment illustrated in FIG. 12, the constraint component 2110 is a pin that interfaces with a constraint slot 2112 of the frame 2104. The pin may be located in a position away from the axle 2106 such that the constraint component 2110 prevents rotation of the stator 1902 around the axle 2106.

The rotor 1904, 1906 may be connected to the rotating component 2108 such that the rotor 1904, 1906 rotates in response to rotation of the rotating component 2108. In the embodiment illustrated in FIG. 21, the first rotor shell 1904 is connected to the rotating component 2108. The second rotor shell 1906, which is not illustrated in FIG. 21 for clarity, may be connected to the first rotor shell 1904 and rotate in conjunction with the first rotor shell 1904. The rotor 1904, 1906 may rotate relative to the frame 2104 and the stator 1902. In some embodiments, the rotor 1904, 1906 is supported relative to the frame 2104 and/or the stator 1902 by a bearing (not shown).

Figure 22:
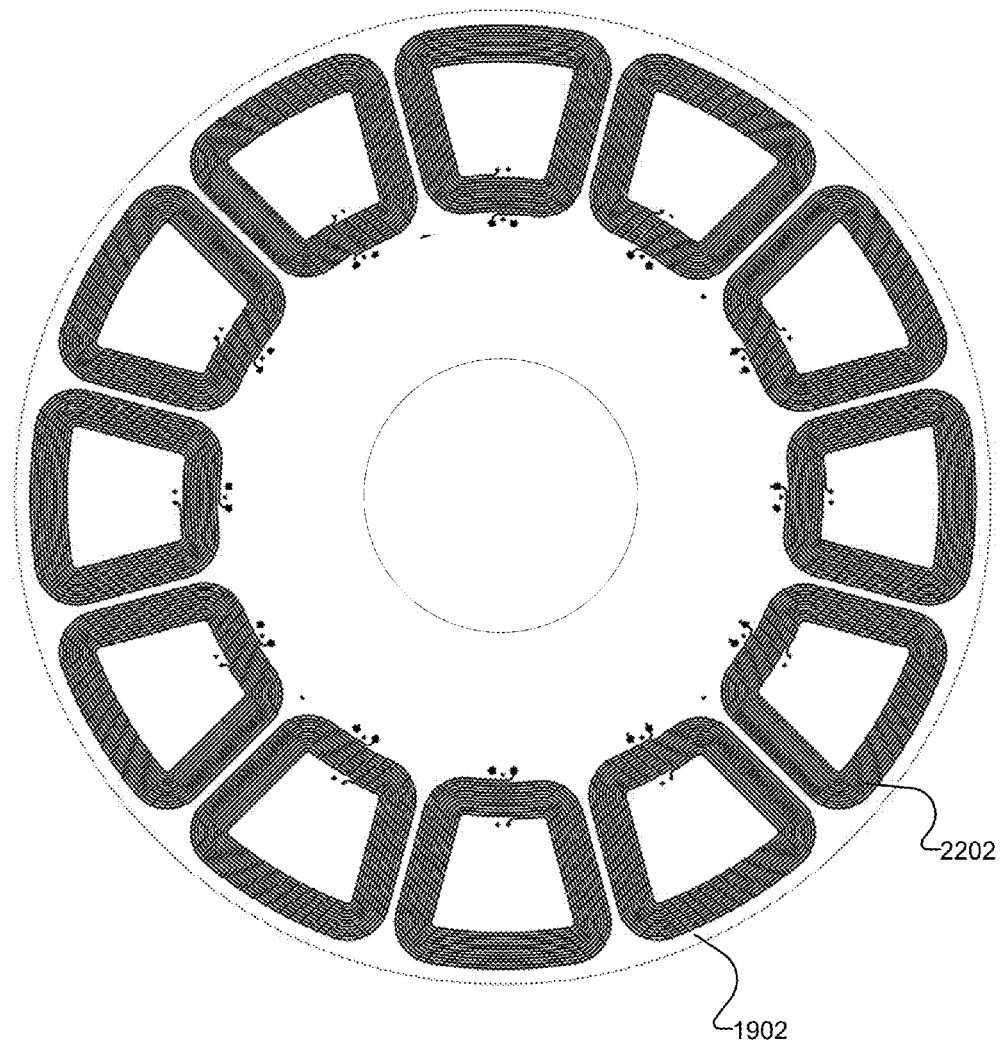
FIG. 22 depicts another side view of one embodiment of the stator of FIG. 19.

FIG. 22 depicts another side view of one embodiment of the stator 1902 of FIG. 19. The stator 1902 includes a plurality of induction coils 2202. The plurality of induction coils 2202 are arranged around a perimeter of the stator 1902. The induction coils 2202 may be in the same plane as the side surface of the stator 1902. The stator 1902 may include any number of induction coils 2202. In one embodiment, the stator 1902 includes an even number of induction coils 2202. In another embodiment, the stator 1902 includes twelve induction coils 2202.

In some embodiments, the stator 1902 comprises a printed circuit board. The plurality of induction coils 2202 may be circuits on the printed circuit board. The circuits printed on the printed circuit board to form the plurality of induction coils 2202 may comprise electrically conductive traces. For example, the circuits may comprise copper traces 0.02 inches wide. The plurality of induction coils may include a trace that winds in an essentially rectangular, rhomboid, pie, or circular shape. The trace may wind in the shape multiple times. For example, the trace may include twelve turns around a rhomboid shape.

The printed circuit board may include a plurality of layers stacked atop each other. For example, the printed circuit board may include four layers of printed circuits. In certain embodiments of a multiple-layer circuit board stator 1902, each layer may include a plurality of induction coils. The induction coils on each layer may be aligned with the induction coils of the other layers such that each induction coil is part of a stack of aligned induction coils. The stack of aligned induction coils may be electrically connected such that a magnetic field influencing any induction coil in the stack of induction coils will simultaneously and similarly influence the other induction coils in the stack. The stacked, aligned, and electrically connected induction coils will thus effectively form a single, multi-layer induction coil, and the current induced in the multi-layer induction coil as the generator operates will be greater than would be produced in a single-layer induction coil having the same physical characteristics. In some embodiments, multiple circuit boards may be stacked and aligned to provide additional induced current.

Figure 23:
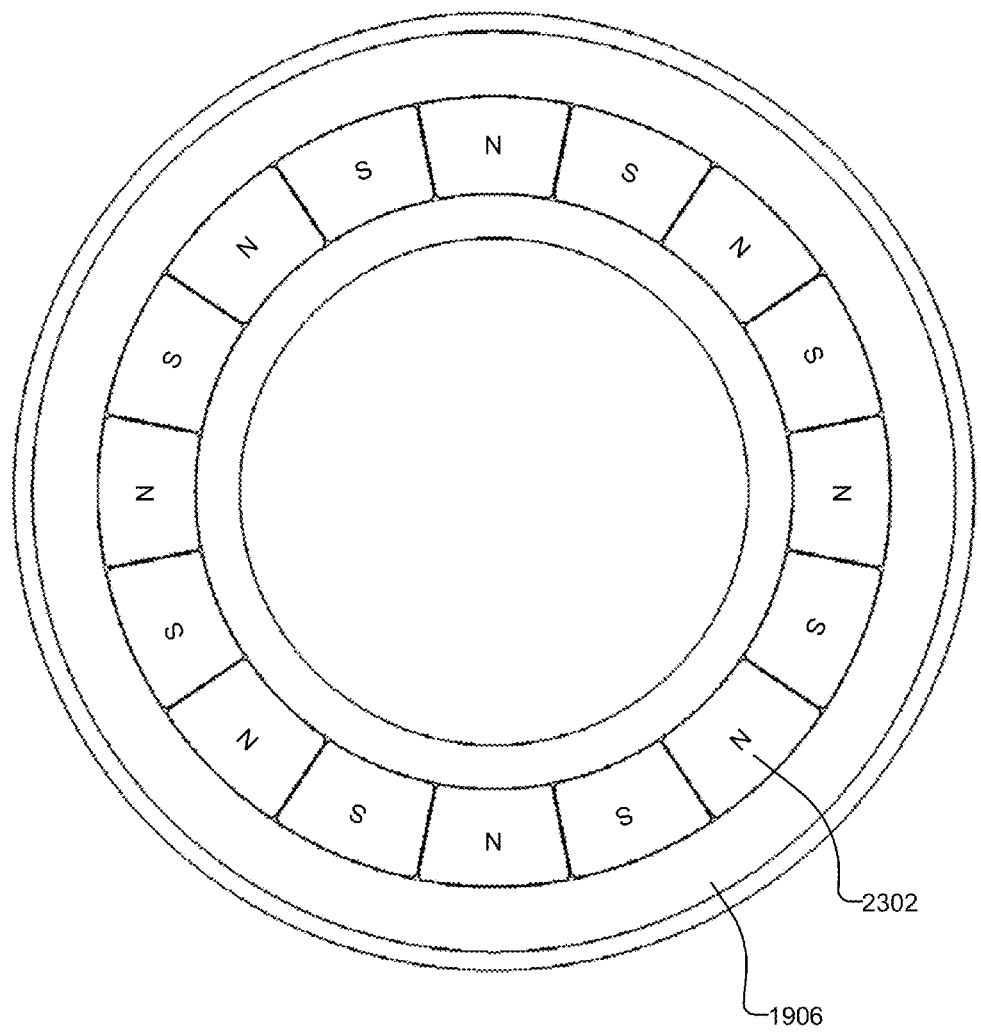
FIG. 23 depicts a side view of one embodiment of the second rotor shell of FIG. 19.

FIG. 23 depicts a side view of one embodiment of the second rotor shell 1906 of FIG. 19. The second rotor shell 1906 may include a plurality of permanent magnets 2302. The plurality of permanent magnets 2302 may be arranged in a circular pattern around a center of the second rotor shell 2302. Each of the plurality of permanent magnets 2302 may be arranged to have a magnetic pole orthogonal to the side of the second rotor shell 1906. Each permanent magnet of the plurality of permanent magnets 2302 may have its magnetic pole reversed relative to the adjacent two permanent magnets. For example, when the generator is assembled, a permanent magnet of the plurality of permanent magnets 2302 may be arranged with its North pole extending toward the rotor 1902. The closest two permanent magnets to this permanent magnet will be arranged with their South poles extending toward the rotor 1902.

In some embodiments, each of the permanent magnets 2302 has a rectangular shape when viewed from the side of the second rotor shell 1906. In an alternative embodiment, each of the permanent magnets 2302 has a rhomboid shape when viewed from the side of the second rotor shell 1906. In another embodiment, the plurality of permanent magnets 2302 may create an essentially annular shape wherein each of the permanent magnets 2302 are in contact or nearly in contact with two adjacent permanent magnets along radial boundaries. One example of a plurality of permanent magnets 2302 magnets shaped and arranged into an essentially annular shape with radial boundaries between adjacent magnets is illustrated in FIG. 23. Magnets that can be shaped an arranged to form an annular shape may be referred to herein as "pie shaped."

The permanent magnets 2302, in one embodiment, are attached to the second rotor shell 1906. The permanent magnets 2302 may be attached to the second rotor shell 1906 using any method known in the art. For example, the permanent magnets 2302 may be attached by welding, adhesive, or another method. In some embodiments, the permanent magnets 2302 may be integrated into the second rotor shell 1906.

In one embodiment, the plurality of permanent magnets 2302 are included with the second rotor shell 1906 and disposed adjacent to a single side of the rotor 1902 when the generator 1204 is assembled. In another embodiment, the plurality of permanent magnets 2302 are included with the first rotor shell 1904 and disposed adjacent to a single side of the rotor 1902 when the generator 1204 is assembled. In yet another embodiment, the plurality of permanent magnets 2302 are included with the first rotor shell 1904 and the second rotor shell 1906 and disposed adjacent to both sides of the rotor 1902 when the generator 1204 is assembled.

The plurality of permanent magnets 2302 may include any type of magnet known in the art. In one embodiment, the plurality of permanent magnets 2302 are made up of rare earth magnets such as a neodymium magnet. For example, the plurality of permanent magnets 2302 may comprise a plurality of N45 neodymium magnets.

Figure 24:
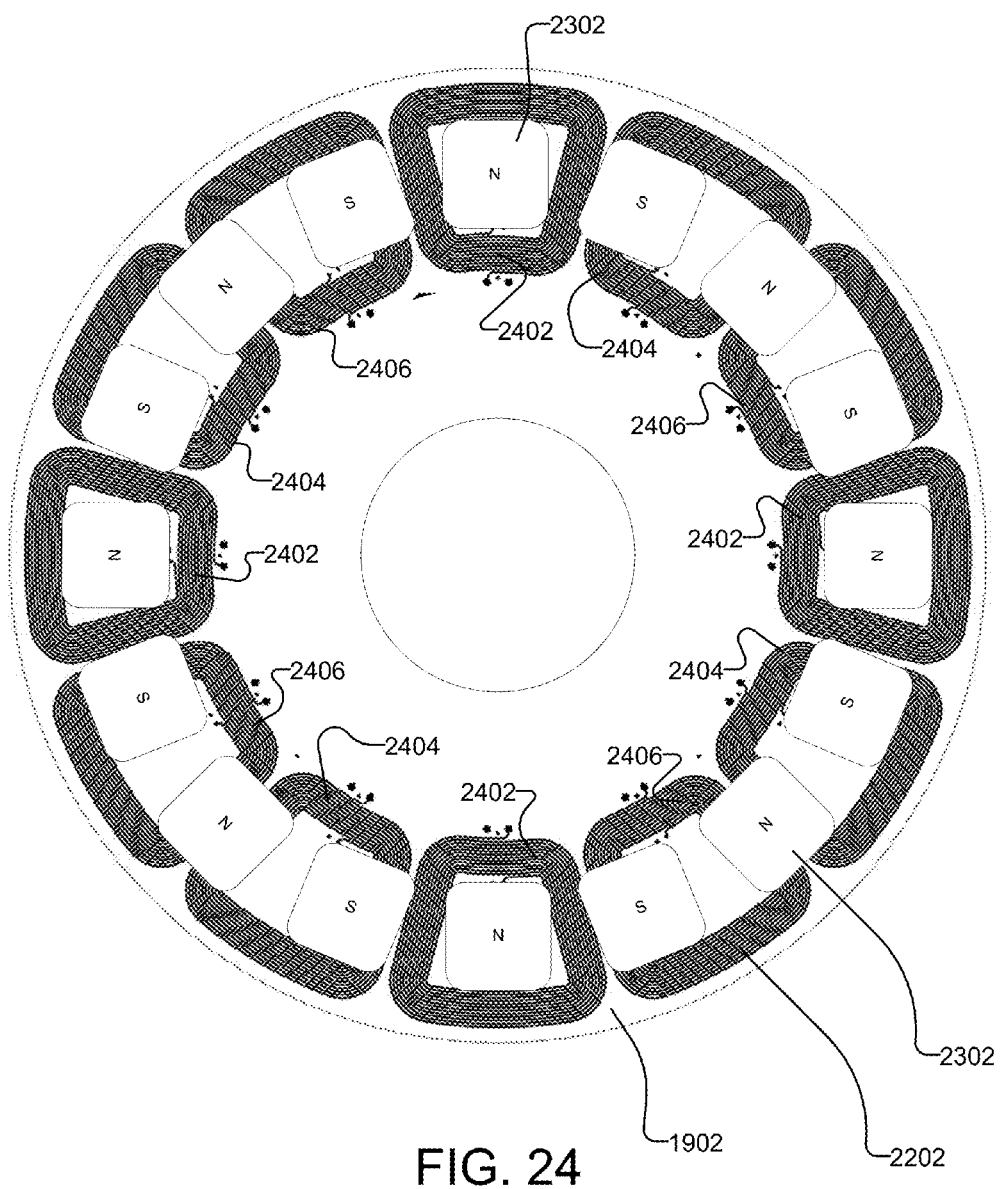
FIG. 24 depicts a side view of one embodiment of the stator of FIG. 19 showing the relative positions of the permanent magnets of FIG. 23.

FIG. 24 depicts a side view of one embodiment of the stator 1902 of FIG. 19 showing the relative positions of the permanent magnets 2302 of FIG. 23. The plurality of inductions coils 2202, in one embodiment, may include a number of induction coils that is divisible by three. For example, the plurality of induction coils 2202 may include twelve induction coils.

In some embodiments, the individual induction coils in the plurality of induction coils 2202 may be electrically connected into three separate groups or phases 2402, 2404, 2406. The induction coils in each phase of induction coils may be arranged around the rotor 1902 such that they are separated by induction coils in the other phases. For example, a first phase 2402 of induction coils may include coils that are separated by a second phase 2404 and a third phase 2406 of induction coils.

In certain embodiments, the generator 1204 is assembled to place the plurality of permanent magnets 2302 adjacent to the rotor. The plurality of permanent magnets 2302 may include four permanent magnets for every three induction coils in the plurality of induction coils 2202. For example, the generator 1204 may include twelve induction coils and sixteen permanent magnets.

By including this ratio of permanent magnets to induction coils, the magnets and coils may be arranged such that the magnets are slightly out of phase with the coils, and the generator may produce three-phase power. In the embodiment illustrated in FIG. 24, the topmost magnet is aligned with the topmost coil, which is in the first phase 2402. Additional magnets having the same pole are aligned with the other coils in the first phase 2402. If the rotor 1904, 1906, and thus, the plurality of permanent magnets 2302, is rotated in a clockwise direction, the next set of magnets to align with coils will be aligned with the coils of the second phase 2404. Following this, a set of magnets will align with the coils of the third phase 2406, and then the cycle will repeat. As can be seen in FIG. 24, the pole of the magnets aligning with each phase will alternate. This arrangement has the result of producing three-phase power as the generator is operated.

Figure 25:
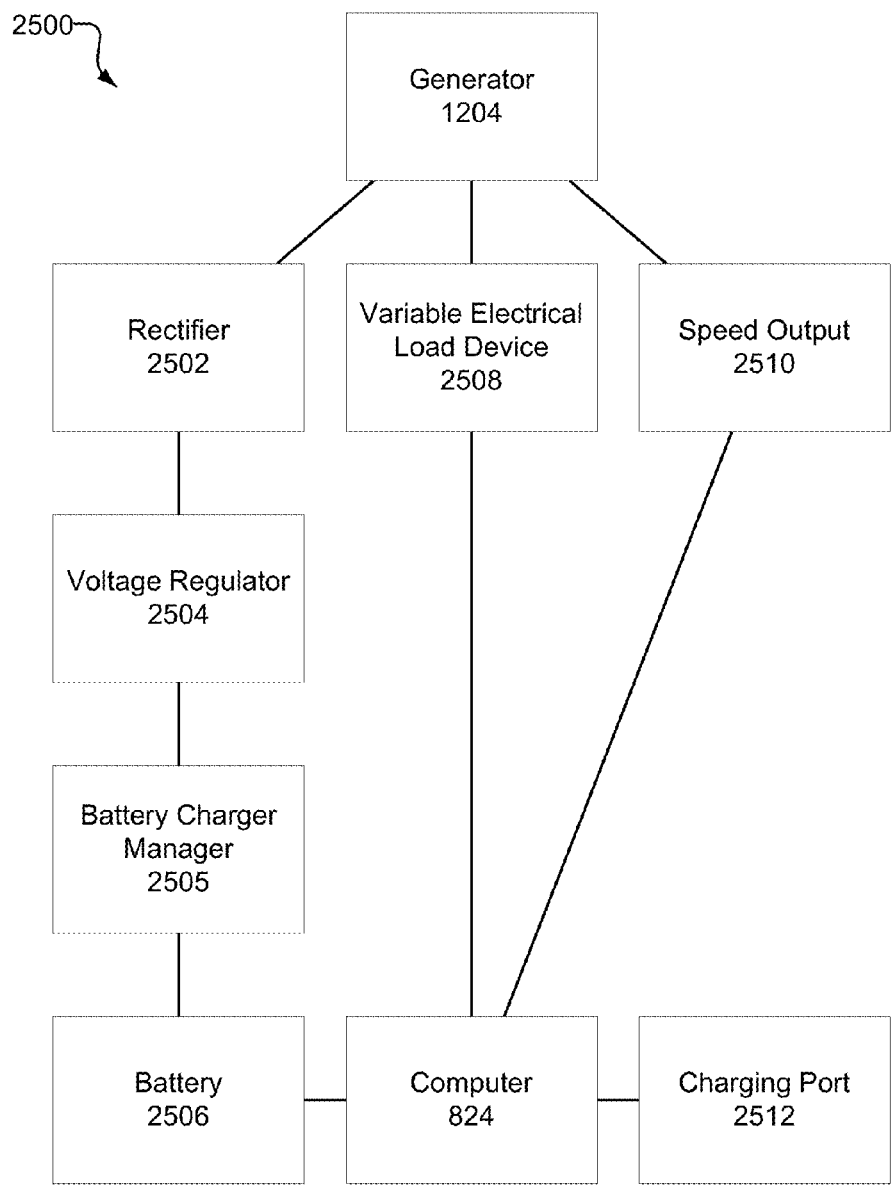
FIG. 25 is a block diagram depicting one embodiment of an exercise equipment system.

FIG. 25 is a block diagram depicting one embodiment of an exercise equipment system 2500. The exercise equipment system 2500 includes the generator 1204, a rectifier 2502, a voltage regulator 2504, a battery charger manager 2505, a battery 2506, a variable electrical load device 2508, the computer 824, a speed output 2510, and a charging port 2512. The generator 1204 and the computer 824 are similar to same-numbered components described above. The exercise equipment system 2500 generates power for use by components of the system 2500.

The rectifier 2502, in one embodiment, converts alternating current (AC) provided by the generator 1204 to direct current (DC). The rectifier may be any type of rectifier known in the art, including a pre-assembled rectifier or a group of diodes. The rectifier 2502 may also convert multi-phase AC power to single-phase DC power. One example of a rectifier 2502 is described below in relation to FIG. 28.

The voltage regulator 2504, in some embodiments, regulates the voltage provided by the generator 1204. The generator 1204 may produce a voltage that varies as the rate of use of the exercise equipment system 2500 varies. In addition, the voltage produced by the generator 1204 may be different than that required by the other components of the system. The voltage regulator 2504 may receive this variable voltage and convert it to a voltage suitable for other components of the system 2500. For example, the voltage regulator 2504 may receive a voltage from the generator 1204 of between eight volts and 75 volts and provide an output of eight volts. One example of a component capable of acting as a voltage regulator 2504 is a Texas Instruments LM5006 switching regulator. As will be appreciated by one skilled in the art, the voltage regulator 2504 may have any suitable input voltage range and may have any suitable output voltage. For example, the voltage regulator 2504 may have an output voltage of between four and thirty volts.

The battery charger manager 2505, in one embodiment, manages charging of the battery 2506. The battery charger manager 2505 may control the power being passed to the battery 2506 to ensure that the battery is charged properly and safely. The battery charger manager 2505 may include a circuit or a chip to manage charging.

In some embodiments the battery 2506 is a rechargeable battery that powers other components of the system 2500 and is recharged by the output of the voltage regulator 2504. The battery 2506 may be any type of rechargeable battery that provides an output suitable for the other components of the system 2500. For example, the battery 2506 may be charged by an eight volt input from the voltage regulator 2504 and power a computer at five volts. An example of a suitable battery 2506 is a lithium iron phosphate (LiFePO4) battery. The system 2500 may include one battery 2506, or may include a plurality of batteries.

The variable electrical load device 2508, in one embodiment, applies a variable electrical load to the generator 1204. Applying an electrical load to the generator 1204 may have a braking effect on the rotating component 2108 by applying a mechanical torque from the generator 1204 to the rotating component 2108, thus increasing the amount of work required to operate the exercise equipment system 2500. This braking effect may replace or augment traditional braking methods for exercise equipment, such as friction brakes.

In one embodiment, the variable electrical load device 2508 is controlled by the computer 824. The computer 824 may direct the variable electrical load device 2508 to increase or decrease an electrical applied to the generator 1204 to increase or decrease the amount of work required to operate the exercise equipment system 2500. The computer 824 may give this direction in response to a user input, in response to a pre-programmed exercise regimen, in response to direction from a group exercise leader, in response to one or more physical characteristics of the user (e.g. heart rate), or any other trigger.

The variable electrical load device 2508 may use any type of variable electrical load. For example, the variable electrical load device 2508 may apply a varying resistance to the generator 1204 and dissipate the resulting energy as heat. In another example, the variable electrical load device 2508 may direct power from the generator 1204 to a battery or batteries at a varying rate. In a further example, the variable electrical load device 2508 may direct power from the generator 1204 to an electrical grid at a varying rate.

The variable electrical load device 2508 may draw AC power directly from the generator 1204. In another embodiment, the variable electrical load device 2508 may draw DC power from the rectifier 2502. In yet another embodiment, the variable electrical load device 2508 may draw regulated power from the voltage regulator 2504.

The speed output 2510, in one embodiment, provides a signal from the generator 1204 to the computer 824. The signal provided to the computer 824 may be a waveform related to the power generated by the generator 1204. The waveform is related to the rate of rotation of the rotating component 2108, and a rate of operation of the exercise equipment system 2500 can be derived from the waveform by the computer 824.

In one embodiment, the generator 1204 outputs AC power having a waveform with a period that correlates to the rotation rate of the rotor 1904, 1906. For example, the waveform may have eight periods per rotation of the rotor 1904, 1906. The rate rotation of the rotating component 2108 may be related to the rate of rotation of the rotor 1904, 1906. For example, the rotating component 2108 may rotate at the same rate as the rotor 1904, 1906. The rotation rate of the rotating member 2108 may be related to the rotation rate of a rotating input of the exercise system 2500, such as a crank on a stationary cycle. When the relationships between these rotating components are known, the computer 824 can apply these relationships to the period provided by the speed output 2510 to determine a desired rate, such as the rate of rotation of a crank (cadence), an estimated equivalent speed, rpm's, or another rate.

The waveform provided by the speed output 2510, in one embodiment, is essentially a sine wave produced by the generator 1204. In another embodiment, the speed output 2510 conditions the waveform produced by the generator to produce a related waveform. For example, the speed output 2510 may square up the sine wave provided by the generator 1204 to produce a digital square wave of the same period. This square wave may allow for simpler processing by the computer 824.

In one embodiment, the charging port 2512 provides a connection for powering and/or charging a personal electronic device. The charging port 2512 may provide power from the generator 1204 or the battery 2506 for a personal electronic device. The charging port may be any type of connector for powering a personal electronic device. Examples of a charging port include a universal serial bus (USB) connector, a DC power connector, an induction coil, and the like. The personal electronic device may be any type of electronic device carried by a user of the system 2500. For example, the personal electronic device may be a cellular phone, such as a smart phone, a tablet computer, a workout management device, a music player, a video player, or the like.

Figure 26:
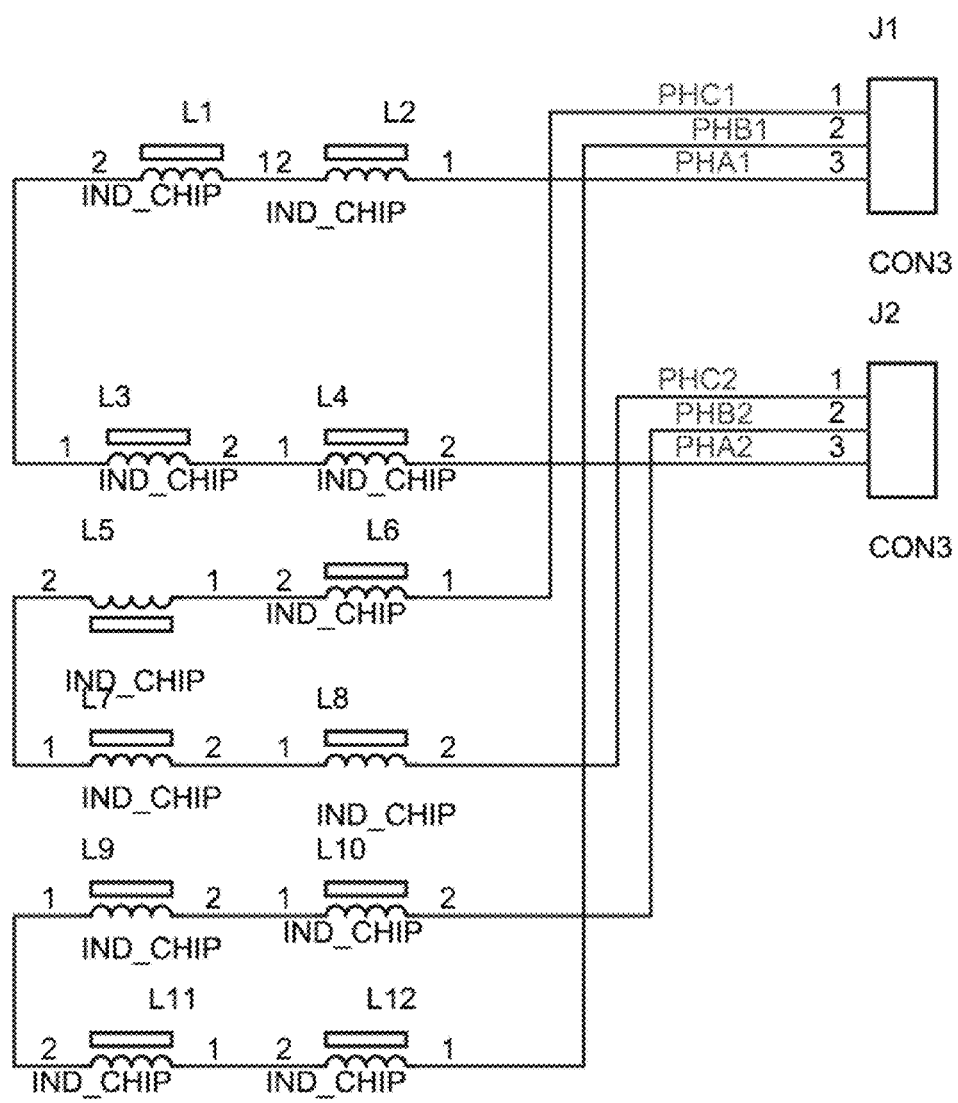
FIG. 26 is a schematic diagram depicting one embodiment of induction coils in the generator of FIG. 19.

FIG. 26 is a schematic diagram depicting one embodiment of the plurality of induction coils 2202 in the generator 1204 of FIG. 19. The schematic diagram shows the wiring of the plurality of induction coils 2202 in three phases. The first phase of induction coils (L1-L4), which correlate to the first phase 2402 shown in FIG. 24, are wired in series. The second phase of induction coils (L5-L8), which correlate to the second phase 2404 shown in FIG. 24, are also wired in series. The third phase of induction coils (L9-L12), which correlate to the third phase 2406 shown in FIG. 24, are also wired in series.

Figure 27:
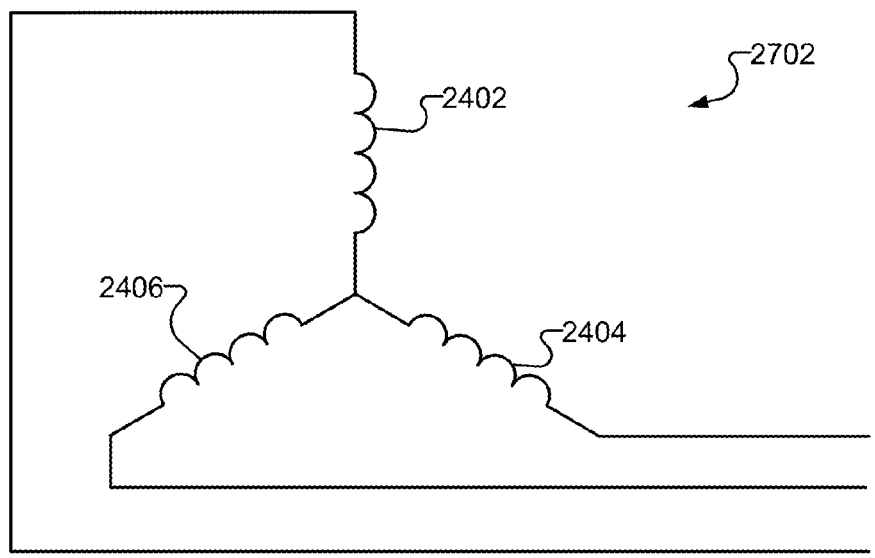
FIG. 27 is a schematic diagram depicting alternatives for wiring embodiments of induction coils in the generator of FIG. 19.
Figure 27:
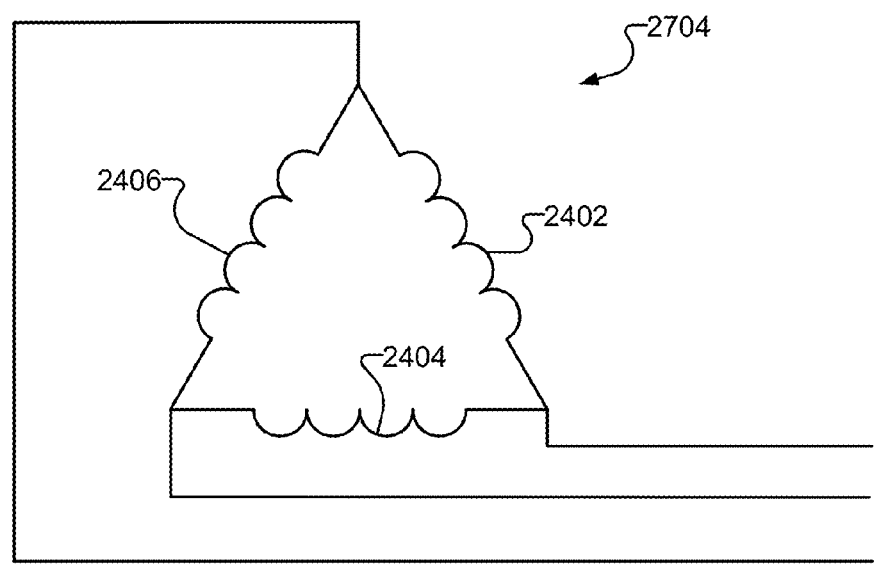

FIG. 27 is a schematic diagram depicting alternatives for wiring embodiments of induction coils in the generator 1204 of FIG. 19. The induction coils may be arranged into three phases 2402, 2404, 2406. The phases 2402, 2404, 2406 may be wired into a star configuration 2702 or a delta configuration 2704.

In one embodiment, the phases 2402, 2404, 2406 are wired in the star configuration 2702. In the star configuration 2702, one end of each of the phases 2402, 2404, 2406 are electrically connected together, and the other end of each of the phases 2402, 2404, 2406 are used as the outputs of the generator 1204. A generator 1204 wired in the star configuration 2702 generally has an output with a higher voltage and a lower current than a generator wired in the delta configuration 2704.

In another embodiment, the phases 2402, 2404, 2406 are wired in the delta configuration 2704. In the delta configuration 2704, the phases 2402, 2404, 2406 are wired in series with one another in a loop, the outputs of the generator 1204 are taken from the connections between the phases 2402, 2404, 2406. A generator 1204 wired in the delta configuration 2704 generally has an output with a lower voltage and a higher current than a generator wired in the star configuration 2702.

Figure 28:
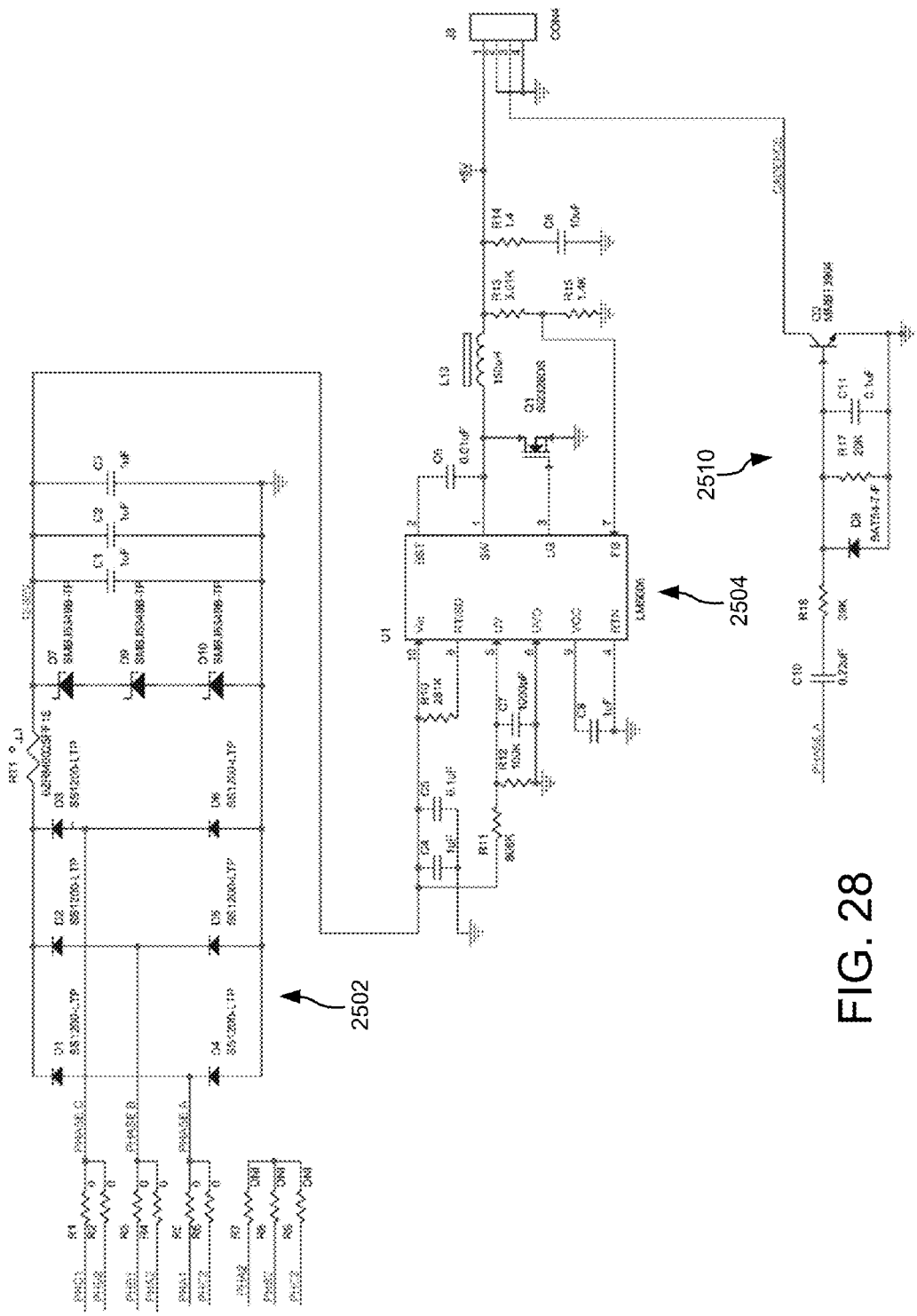
FIG. 28 is a schematic diagram depicting one embodiment of a rectifier, a voltage regulator, and a speed output.

FIG. 28 is a schematic diagram depicting one embodiment of a rectifier 2502, a voltage regulator 2504, and a speed output 2510. The rectifier 2502 includes six diodes (D1-D6), two diodes for each phase (PHASE A, PHASE B, PHASE C). The rectifier 2502 converts the three phase AC output of the generator 1204 to DC. In some embodiments, the system provides additional smoothing of the output using capacitors and other components.

The voltage regulator 2504 manages the variable voltage provided by the rectifier 2502. In one embodiment, the voltage regulator 2504 is a solid-state switching regulator that converts an input between twelve volts and 36 volts to an eight volt output. The speed output 2510, in one embodiment, converts the AC waveform output of one of the phases of the generator 1204 into a square wave having the same period.

Figure 29:
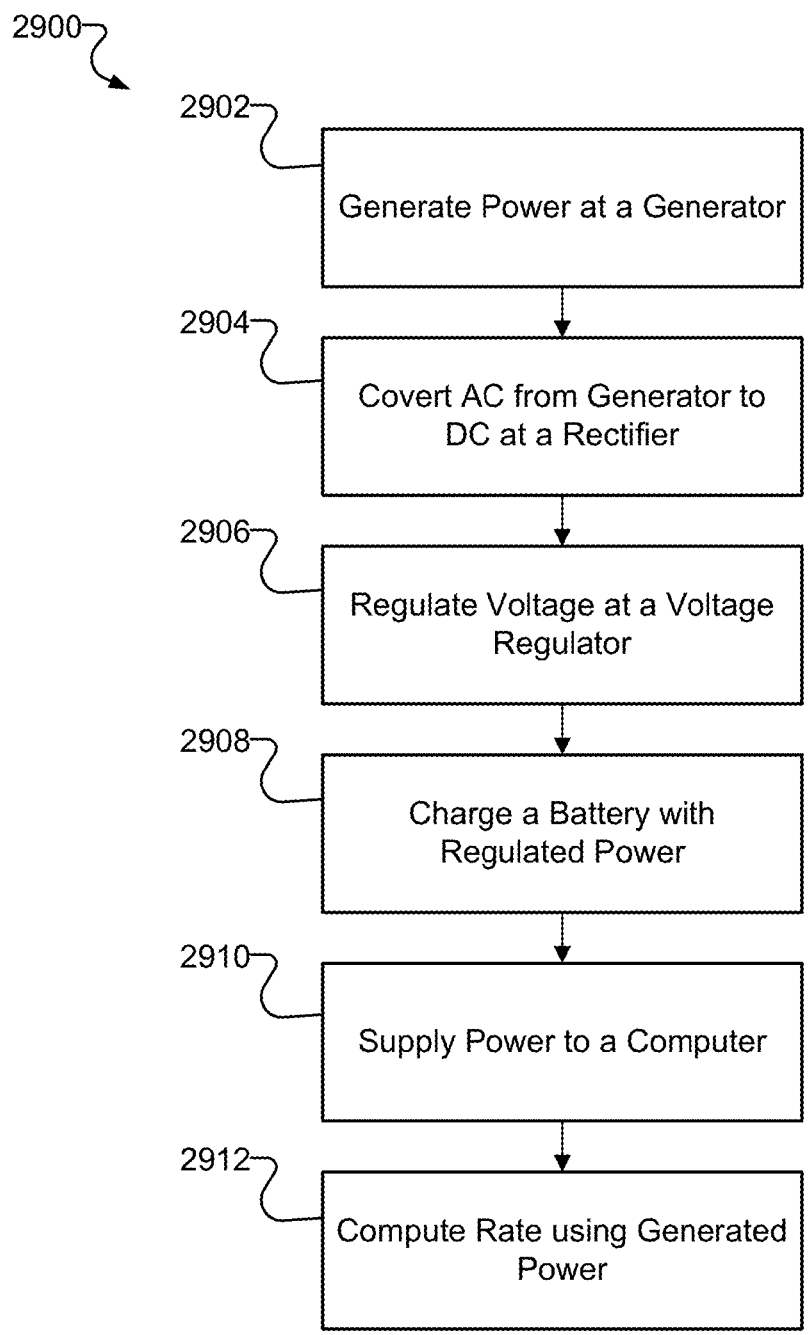
FIG. 29 depicts a flowchart diagram showing one embodiment of a method for generating power and using generated power in an exercise apparatus.

FIG. 29 depicts a flowchart diagram showing one embodiment of a method 2900 for generating power and using generated power in an exercise apparatus. The method 2900 is in certain embodiments a method of use of the system and apparatus of FIGS. 11, 12, and 19-28, and will be discussed with reference to those figures. Nevertheless, the method 2900 may also be conducted independently thereof and is not intended to be limited specifically to the specific embodiments discussed above with respect to those figures.

As shown in FIG. 29, power is generated 2902 at a generator 1204 connected to a rotating component 2108 of an exercise apparatus 2102. The generated 2902 power may be three phase power and may be produced by a generator having a stator 1902 and a rotor 1904, 1906.

In some embodiments, the AC output of the generator 1204 is converted 2904 to DC at a rectifier 2502. The voltage of the system may be regulated 2906 at a voltage regulator 2504 to provide a desired power output for the system. The power output may be used to charge 2908 a rechargeable battery 2506.

In one embodiment, power generated 2902 by the generator 1204 supplies 2910 power to a computer 824. The supplied 2910 power may be AC directly from the generator 1204, DC provided from the rectifier 2502, or regulated voltage provided by the voltage regulator 2504. In another embodiment, the power supplied 2910 to the computer 824 is provided by the rechargeable battery 2506.

The computer 824, in certain embodiments, uses a signal from the power generated by the generator 1204 to compute 2912 a rate. The rate may indicate a rate of operation of the exercise apparatus 2102. For example, the computer 2912 may receive a waveform that has a mathematical relationship to the rate of operation of the exercise apparatus 2102. The computer may apply a calculation to the received waveform to determine the rate of operation and may then display or otherwise communicate the rate of operation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An exercise apparatus comprising:
   a frame;
   a rotating component rotatably connected to the frame, wherein the rotating component rotates in response to operation of the exercise apparatus;
   a generator connected to the rotating component and the frame, the generator comprising:
     a rotor connected to the rotating component, the rotor to rotate in response to rotation of the rotating component; and
     a stator connected to the frame, the stator to interact with the rotor to produce electric current at an output;
     wherein the rotor comprises a plurality of permanent magnets disposed adjacent to a first side of the stator and a plurality of magnets disposed adjacent to a second side of the stator aligned with and having synchronized poles with the magnets disposed adjacent to the first side of the stator; and
   a battery connected to the output wherein the battery is charged by electric current from the generator.

2. The exercise apparatus of claim 1, wherein the exercise apparatus is selected from the group consisting of a cycle, a stationary cycle, an elliptical machine, a stepper, a rowing machine, and a treadmill.

3. The exercise apparatus of claim 1, wherein the stator comprises a plurality of induction coils, and wherein rotation of the rotor causes a plurality of induction coils to pass through magnetic fields generated by a plurality of permanent magnets to induce an electric current in the induction coils.

4. The exercise apparatus of claim 1, wherein the stator comprises a plurality of induction coils, and wherein rotation of the rotor causes magnetic fields generated by the plurality of permanent magnets to sweep across the plurality of induction coils to induce an electric current in the plurality of induction coils.

5. The exercise apparatus of claim 4, wherein
   the plurality of induction coils are electrically connected in three groups;
   the plurality of permanent magnets are configured such that rotation of the plurality of permanent magnets across the three groups of induction coils generates three-phase power; and
   the groups of induction coils are electrically connected in a configuration selected from the group consisting of a star arrangement and a delta arrangement.

6. The exercise apparatus of claim 4, wherein the rotor comprises sixteen magnets and the stator comprises twelve induction coils.

7. The exercise apparatus of claim 4, wherein each of the plurality of induction coils comprises an induction coil on each of a plurality of stacked printed circuit board layers arranged to place the induction coil on each of the plurality of printed circuit board layers under the simultaneous influence of the same magnetic field.

8. The exercise apparatus of claim 4, wherein the rotor comprises a plurality of magnets arranged with alternating poles directed toward the stator.

9. The exercise apparatus of claim 4, wherein the plurality of permanent magnets are each of a rectangular shape in the plane orthogonal to the poles of the permanent magnet.

10. The exercise apparatus of claim 4, wherein the plurality of permanent magnets are each of a pie shape in the plane orthogonal to the poles of the permanent magnet.

11. The exercise apparatus of claim 1, further comprising a variable electrical load device that provides a variable electrical load, wherein a braking torque applied by the generator to the rotating component increases in response to an increase in the variable electrical load.

12. An exercise equipment system comprising:
an exercise apparatus comprising:
a frame; and
a rotating component rotatably connected to the frame, wherein the rotating component rotates in response to operation of the exercise apparatus;
a generator connected to the exercise apparatus comprising:
a rotor connected to the rotating component, the rotor to rotate in response to rotation of the rotating component; and
a stator connected to the frame, the stator to interact with the rotor to produce electric current at an output;
wherein the rotor comprises a plurality of permanent magnets disposed adjacent to a first side of the stator and a plurality of magnets disposed adjacent to a second side of the stator aligned with and having synchronized poles with the magnets disposed adjacent to the first side of the stator; and
a computer in electrical communication with the generator, the computer comprising:
a processor to conduct operations on one or more input signals from the exercise equipment system to determine information relating to operation of the exercise equipment system;
a memory device to store digital data for use in the operation of the processor; and
a display driver to generate a display of information determined by the processor.

13. The exercise equipment system of claim 12, further comprising a voltage regulator to regulate voltage produced by the generator.

14. The exercise equipment system of claim 12, further comprising a battery electrically connected to the generator, wherein power from the generator charges the battery.

15. The exercise equipment system of claim 12, wherein the generator powers the computer.

16. The exercise equipment system of claim 12, wherein the generator provides power for a personal electronic device via a charging port connected to the exercise equipment system.

17. The exercise equipment system of claim 12, wherein:
the generator further comprises a speed output that provides a waveform generated by the generator;
the computer further comprises a rate meter in electrical communication with the speed output;
the rate meter comprises computer instructions to direct the processor to determine a rate of operation of the exercise equipment system based on the waveform from the speed output; and
the computer displays the rate of operation of the exercise equipment.

18. The exercise equipment system of claim 12 wherein:
the rotor comprises a plurality of permanent magnets;
the stator comprises a plurality of induction coils;
rotation of the rotor causes magnetic fields generated by the plurality of permanent magnets to sweep across the plurality of induction coils to induce an electric current in the plurality of induction coils;
the plurality of induction coils are electrically connected in three groups;
the plurality of permanent magnets are configured such that rotation of the plurality of permanent magnets across the three groups of induction coils generates three-phase power; and
the groups of induction coils are electrically connected in a configuration selected from the group consisting of a star arrangement and a delta arrangement;
each of the plurality of induction coils comprises an induction coil on each of a plurality of stacked printed circuit board layers arranged to place the induction coil on each of the plurality of printed circuit board layers under the simultaneous influence of the same magnetic field;
the exercise equipment system further comprises:
a variable electrical load device that provides a variable electrical load, wherein a braking torque applied by the generator to the rotating component increases in response to an increase in the variable electrical load;
a computer in electrical communication with the generator, the computer comprising:
a processor to conduct operations on one or more input signals from the exercise equipment system to determine information relating to operation of the exercise equipment system;
a memory device to store digital data for use in the operation of the processor; and
a display driver to generate a display of information determined by the processor;
a voltage regulator to regulate voltage produced by the generator and;
a battery electrically connected to the generator, wherein power from the generator charges the battery;
the generator further comprises a speed output that provides a waveform generated by the generator;
the computer further comprises a rate meter in electrical communication with the speed output;
the rate meter comprises computer instructions to direct the processor to determine a rate of operation of the exercise equipment system based on the waveform from the speed output; and
the computer displays the rate of operation of the exercise equipment.

* * * * *